(12) United States Patent
Wolff

(10) Patent No.: US 7,383,230 B2
(45) Date of Patent: Jun. 3, 2008

(54) SYSTEM AND METHOD FOR THE EFFICIENT EXCHANGE AND PRICING OF SERVICES AND INTANGIBLE WORKS

(76) Inventor: Gregory J. Wolff, 560 California Way, Redwood City, CA (US) 94062

(*) Notice: Subject to any disclaimer, the term of this patent is extended or adjusted under 35 U.S.C. 154(b) by 129 days.

(21) Appl. No.: 11/112,125

(22) Filed: Apr. 22, 2005

(65) Prior Publication Data

US 2005/0240531 A1 Oct. 27, 2005

Related U.S. Application Data

(60) Provisional application No. 60/649,788, filed on Feb. 2, 2005, provisional application No. 60/610,856, filed on Sep. 14, 2004, provisional application No. 60/565,040, filed on Apr. 23, 2004.

(51) Int. Cl.
*H04K 1/00* (2006.01)
*H04L 9/00* (2006.01)
(52) U.S. Cl. .......................... 705/53; 705/51; 705/53; 705/64; 380/227; 380/228; 380/229; 380/230; 235/379; 340/825.33; 902/2
(58) Field of Classification Search .................. 705/53, 705/64, 51; 380/227–230; 235/379; 340/825.33; 902/2
See application file for complete search history.

(56) References Cited

U.S. PATENT DOCUMENTS 6,226,618 B1 * 5/2001 Downs et al. ................. 705/1

OTHER PUBLICATIONS

Automated e-Business Negotiation: Model, Life Cycle, and System Architecture, Haifei Li, Univ. of Florida, 2001, http://etd.fcla.edu/UF/UFE0000327/Haifei_li_dissertation.pdf (Google search).*

Issue in Distributed Database Security, Downing et al., SRI International, 1990, http://ieeexplore.ieee.org/iel2/270/2662/00081051.pdf?tp=&isnumber=&arnumber=81051.*

Discerning behavioral properties by analyzing transaction logs, Srinivasa et al., Mar. 19-21, 2000, http://delivery.acm.org/10.1145/340000/335763/p281-srinivasa.pdf?key1=335763 &key2=2536400911&coll=GUIDE&dl=GUIDE &CFID=35457523&CFTOKEN=56677676.*

* cited by examiner

*Primary Examiner*—Jalatee Worjloh
*Assistant Examiner*—Nancy T. Le
(74) *Attorney, Agent, or Firm*—Greg T. Sueoka

(57) ABSTRACT

An exchange system for intangible goods comprises a first user system, a second user system, a registry system, a clearinghouse system and a hash module coupled for communication with each other. The first and second user systems includes a content module for acting as a repository for intangible goods, a pricing module for setting the price of intangible goods, a transaction generator module for creating transactions between seller and buyer, and a transaction log module for recording any transaction in which the user system participates. These systems are used to consummate transactions with other users for exchanging intangible goods. As part of each transaction, the user and the transaction must be entered or registered in the registry system. The registry system comprises an account module and a transaction log module for maintaining the anonymity of the sellers and buyers. The hash module is used by the other modules to generate unique hash codes that are used to access transactions and to validate users. The clearinghouse system includes an account module, an audit module, and a transaction log module for clearing and posting transactions once they have been verified between two users.

18 Claims, 11 Drawing Sheets

Account Balances In Multiple Currencies

1000

| Account | Denomination/Service Obligations | | |
|---|---|---|---|
| | A123 | B573 | C869 |
| A123 | 5 | 7 | 0 |
| B573 | 3 | 10 | 2 |
| C869 | 2 | 23 | 0 |
| ... | | | |
| Registry | 10 | 40 | 2 |

Figure 10

SYSTEM AND METHOD FOR THE EFFICIENT EXCHANGE AND PRICING OF SERVICES AND INTANGIBLE WORKS

CROSS-REFERENCE TO RELATED APPLICATION

This application relates to U.S. Provisional Patent Application Ser. No. 60/565,040, entitled "The Social Web Technology Overview," by Gregory J. Wolff, filed Apr. 23, 2004, which is incorporated herein by reference in its entirety. This application also relates to U.S. Provisional Patent Application Ser. No. 60/610,856, entitled "Means for the Exchange and Pricing of Digital Goods," by Gregory J. Wolff, filed Sep. 14, 2004, and U.S. Provisional Patent Application Ser. No. 60/649,788, entitled "Accounting Mechanism for the Exchange of Services and Intangible Goods" by Gregory J. Wolff, filed Feb. 2, 2005 both of which are also incorporated herein by reference in their entirety.

BACKGROUND OF THE INVENTION

1. Field of the Invention

The present invention relates to systems and methods for performing trades or exchanges. In particular, the present invention relates to a system and method for the efficient exchange and pricing of services, digital goods, and intangible works.

2. Description of the Background Art

With the development of the personal computer and the Internet, there are now more ways than ever to distribute and sell intangible works. Intangible works can be any digital work such as digital files that include music, audio books, movies and video content, software applications and programs, or any information. Moreover, there are many more individuals with computers and access to the Internet that can create, produce, distribute and sell intangible works. For example, there has been a dramatic rise in the number and types of intangible goods and services that are exchanged. Such intangible goods are oftentimes exchanged without charge because there is not a mechanism to fairly and adequately compensate the creators or owners of digital content for their efforts. While there have been some attempts in the prior art to solve this problem, they have not been successful.

There currently exist a variety of systems for exchanging goods and services for other goods and services or even money or other types of credits. For example, credit card transactions are well known. Also, with the development of the Internet commerce, there are a variety of services such as PayPal® that will arrange for the payment of goods and services. There has also been a change in how banking is conducted, with the major banks offering electronic payment via the Internet for many goods and services. However, all of these conventional methods require some affiliation or relationship to a bank or financial institution that converts the price to a currency and handles the exchange. Furthermore, none of the existing systems provides a model for pricing intangible works to account for inherent characteristics that allows simultaneous use and low cost of production. While there are currently some bartering systems that have become electronic, they typically involve a party-to-party transaction with no underlying system to price items and exchange credits electronically. Thus, there is a need for a system and methods for the exchange of intangible goods and services.

Yet another problem with existing systems is the potential for fraud and identity theft. With a small amount of information, a fraudulent user can perform any variety of transactions. In transactions involving digital goods, the risks of fraud are even greater because once the intangible goods have been sent there is typically little recourse for the seller or owner. Thus, buyers have become reluctant to provide personal information to sellers that could in turn be fraudulently used. Thus, there is also a need for a system for a blind method for registering and validating a single identifier for a user such as an email address.

Therefore, what is needed is a system and methods for implementing an exchange system for intangible goods that overcomes the limitations found in the prior art.

SUMMARY OF THE INVENTION

The present invention overcomes the deficiencies and limitations of the prior art by providing a system and method for the efficient exchange and pricing of services and intangible works. In one embodiment, the exchange system of the present invention comprises: a first user system, a second user system, a registry system, a clearinghouse system and a hash module. These systems and the hash module are each coupled to a network for communication with each other. The user systems are similar and each preferably includes a content module for acting as a repository for intangible goods, a pricing module for setting the price of intangible goods, a transaction generator module for creating transactions between seller and buyer, and a transaction log module for recording any transaction in which the user system participates. Communication between a transaction generator module and the transaction log modules of both parties are required for an exchange transaction. These systems are used to consummate transactions with other users for exchanging intangible goods. To support trusted exchanges, users and transactions are entered or registered in the registry system. The registry system preferably comprises an account module and a transaction log module for maintaining the anonymity of the sellers and buyers. This is particularly advantageous because it provides a system that does not require any sensitive personal information to be provided to perform exchanges with the present invention. The hash module is used by the other modules to generate unique hash codes that are used to access transactions and to validate users. The clearinghouse system preferably includes an account module, an audit module, and a transaction module. The clearinghouse system preferably clears and posts transactions once they have been verified.

The present invention also includes a number of novel methods including: a method for registering a user and a transaction in the registry, a method for performing an exchange of goods or services, a method for pricing exchanges, and a method for auditing outstanding transactions.

BRIEF DESCRIPTION OF THE DRAWINGS

The invention is illustrated by way of example, and not by way of limitation in the figures of the accompanying drawings in which like reference numerals refer to similar elements.

FIGS. 9 and 10 are graphical representations of user interfaces for showing the works accessible to a user and account balances in multiple currencies.

DETAILED DESCRIPTION OF THE PREFERRED EMBODIMENTS

Figure 1A:
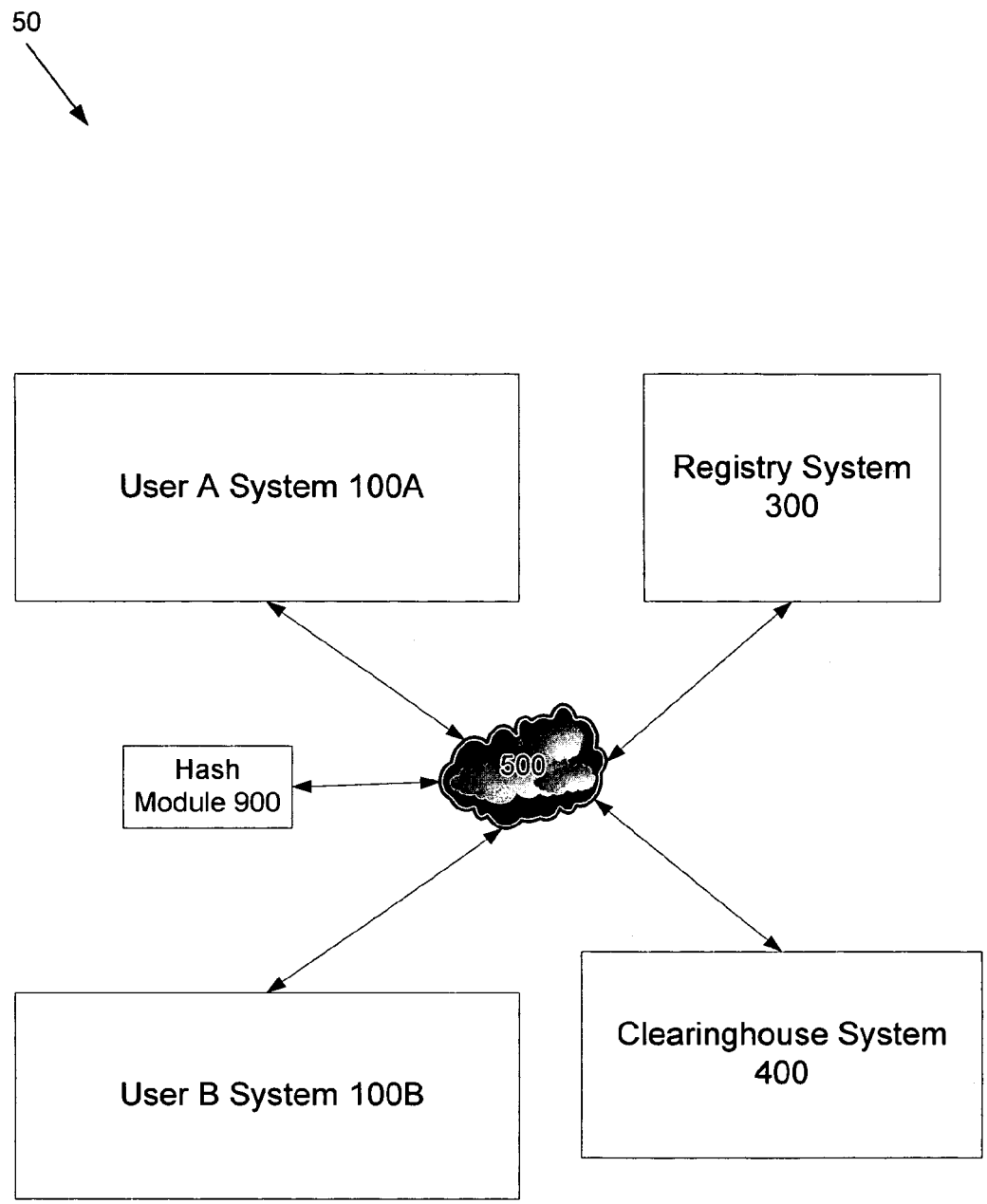
FIG. 1A is a conceptual block diagram of an exemplary exchange system constructed according to the present invention.

A system and method for the efficient exchange and pricing of services and intangible works is described. More specifically, the present invention is a software solution that does not require additional hardware or hardware changes and can operate on a variety of platforms to provide efficient exchange and pricing of services and intangible works. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to digital files that represent audio works, video works, or information. However, the present invention applies to any distributed computing system that has an ability to send and receive information and send and receive intangible goods.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description that discussions utilizing terms such as "processing" or "computing" or "calculating" or "determining" or "displaying" or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient, to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with a computing system. Such a computing system as claimed may be an entire system or only portions of such a system. For example, the present invention can operate on a personal computer, or a server system that includes only certain modules. Thus, the present invention is capable of operating with any computing system from those with minimal functionality to those providing all the functionality disclosed herein.

Definitions

The present invention describes a system 50 for the efficient exchange and pricing of services and intangible works, and in doing so uses a number of terms, some of which are defined below as follows:

User. Denoted as U is an individual user of the system.

Work. Denoted as G is the digital representation of an intangible work. The work can be any digital work such as digital files that include music, audio books, movies and video content, software applications and programs, or any information.

Identifier of a Work. Denoted as H(G) is a unique identifier for a particular digital work, typically the output of the Hash Module applied to the digital work.

Seller or Owner. Denoted as C is the party whose account is to be credited upon completion of a transaction.

Identifier of Seller or Owner. Denoted as H(C) is the identifier associated with the account to be credited. The identifier is typically the output of the Hash Module applied to some information unique to the party owning the credit account, such as his or her email address.

Buyer. Denoted as D is the party whose account is to be debited upon completion of a transaction.

Identifier of Buyer. Denoted as H(D) is the identifier associated with the account to be debited. The identifier is typically the output of the Hash Module applied to some information unique to the party owning the debit account, such as his or her email address.

Denomination. Denoted as Den is the denomination of currency to be transferred in an exchange of currency or for a work.

Amount. Denoted as Amt is the number of units of a given denomination to be transferred in an exchange of currency or for a work.

Price. Denoted as P is the price of a work, as expressed in units (Amt) of a given denomination (Den).

Transaction Record. Denoted as T is the transaction record. The transaction record is a set of parameters associated with a particular exchange. In one embodiment, the transaction record includes 1) an identifier of a credit-account holder, H(C); 2) the identifier of a debit-account holder, H(D); 3) the identifier for the good, H(G); 4) a denomination of currency to be transferred, Den; 5) the amount of currency to be transferred, Amt; and 6) the date.

Identifier of the Transaction Record. Denoted as H(T) is an identifier associated with a particular transaction record. This identifier is usually the output of the Hash Module applied to the set of parameters constituting the transaction record.

$A \xrightarrow{x,y} B$. A sends information containing the items x and y to B. Sending is usually accomplished by using SMTP, HTTP or some other standard for data communications. It should be noted that whenever a digital object, X, is sent, H(X) may also be sent. This enables the recipient to check the integrity of the data before using it to represent said object.

Start#, End#. The End# is a hash of the Start# along with all of the transactions in the list, signed with the private key of the user. The End# can only be created by a user who knows the secret information associated with the user /owner of the transaction log. However, that End# can be verified by anyone who has the public-key associated with that user. This End# becomes the new Start# for the transaction log associated it with the subsequent time.

Key. A key is any value or set of values that uniquely identifies a record in a database. The hash of a digital object is considered the primary key for the digital object and functions as a key; other values may also function, alone or in tandem, as keys.

Concept Overview

Referring now to FIG. 1A, one embodiment of an exchange system 50 is shown. The present invention provides a means by which groups of individuals can engage in the fair and efficient exchange of services and intangible works such as pieces of software, word processing documents, audio files, or other examples of digital media. The exchange system 50 preferably comprises: a first user system 100A, a second user system 100B, a registry system 300, a clearinghouse system 400 and a hash module 900. These systems 100A, 100B, 300, 400 and the hash module 900 are each coupled to a network 500 for communication with each other.

Figure 1B:
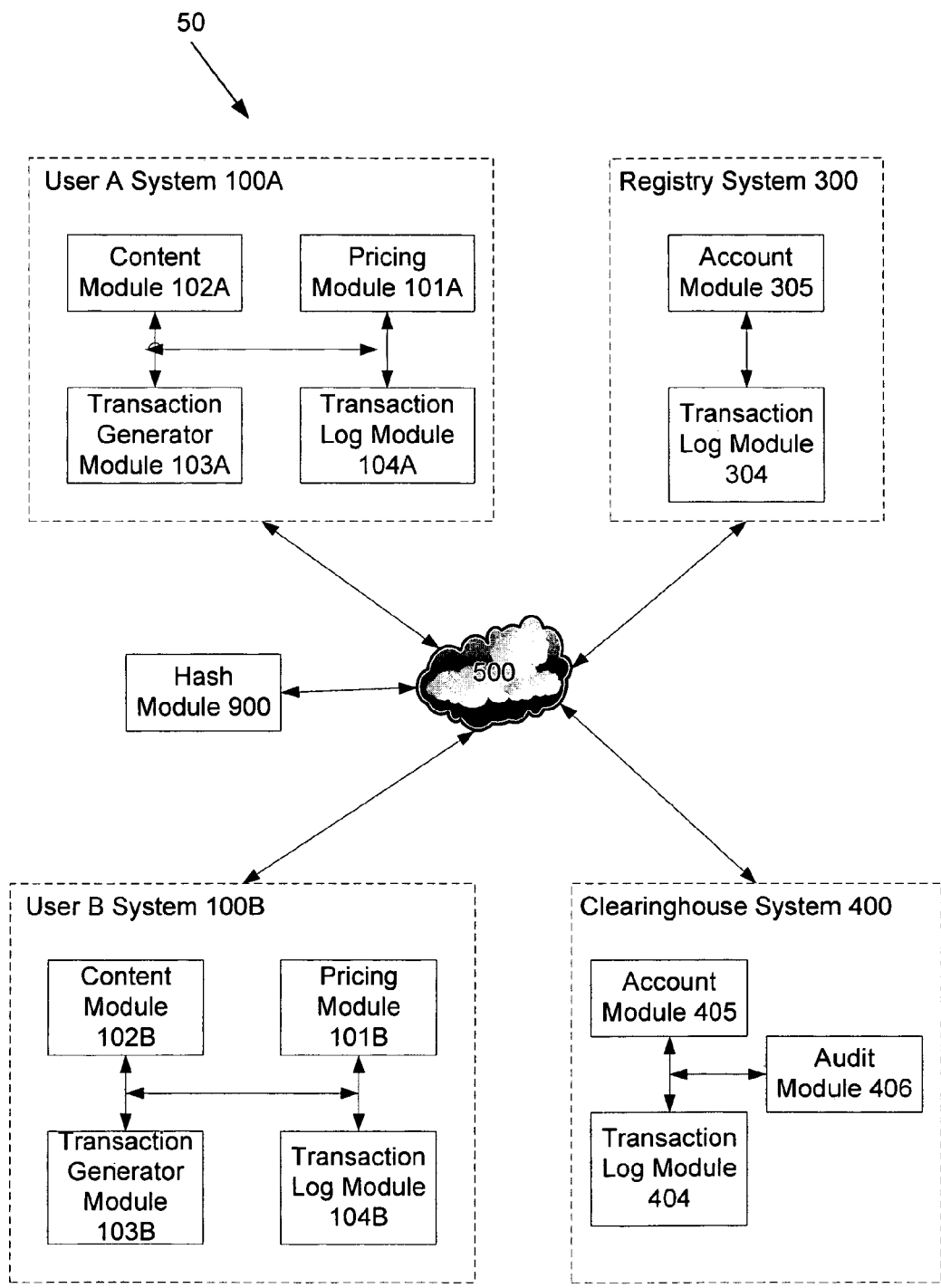
FIG. 1B is a detailed block diagram of the exemplary exchange system constructed according to the present invention.

The present invention will now be described throughout this patent application in the context of the system 50 shown in FIGS. 1A and 1B. Those skilled in the art will recognize there may be a variety of different configurations for providing an exchange system, and the system 50 of FIG. 1B is merely an example. Systems according to the present invention may have any number of user systems 100, registry systems 300, clearinghouse systems 400 and hash modules 900 coupled together in various groupings. The systems shown in FIGS. 1A and 1B and described below are merely an exemplary system in its simplest form to describe the principles of the present invention.

The first and second user systems 100A, 100B are systems for users to create and store works, as well as engage in exchanges as will be described in detail below. The first and second user systems 100A, 100B also provide the mechanism for the user to communicate with other users, the registry system 300, the clearinghouse system 400 and the hash module 900.

The registry system 300 is provided to register works, users and transactions. In response to receiving a request for registration, the registry system 300 will register the work, user or transaction. Thereafter, if provided with an identifier for the user, work or transaction, the registry will validate the identifier by providing information about the item corresponding to the identifier. If there is not a user, work or transaction corresponding to the identifier, an error is returned. This provides a mechanism to validate the integrity and source of items without requiring access to all information pertaining to an item.

The clearinghouse system 400 is used to reconcile transactions by allocating debits and credits. The clearinghouse system 400 communicates with the first and second user systems 100A, 100B to determine the transactions to which they have been parties. The clearinghouse system 400 also communicates with the registry to validate transactions and parties. The functionality of the clearinghouse system 400 will be described in more detail below.

The hash module 900 provides a common functionality to the other modules and is described in detail below. The hash module 900 generates unique identifiers that can be associated with transactions, users and works or combinations these items.

System

Referring now to FIG. 1B, the system 50 is shown in more detail. The first user system 100A preferably comprises a pricing module 101A, a content module 102A, a transaction generator module 103A, and a transaction log module 104A to facilitate the exchange of digital works and to log transactions. These modules 101A, 102A, 103A, and 104A are coupled to a bus for communication with each other and the other systems 100A, 100B, 300, 400. The basic functionality of these modules is described here with more detail provided below with reference to FIG. 3.

Similarly, the second user system 100B comprises a pricing module 101B, a content module 102B, a transaction generator module 103B, and a transaction log module 104B to facilitate the exchange of digital works and log transactions. These modules 101B, 102B, 103B, and 104B are coupled to a bus for communication with each other and the other systems 100A, 100B, 300, 400.

The registry system 300 includes an account module 305 and a transaction log module 304 coupled to a bus for communication with each other and the other systems 100A, 100B, 300, 400. As part of each transaction, each user and each work is entered or registered in the registry system 300. The registry system 300 preferably maintains the anonymity of the sellers and buyers. The registry system 300 logs transactions, maintains user account information, and authenticates user identifiers. This is particularly advantageous because it provides a system that does not require any sensitive personal information be provided to perform exchanges with the present invention.

The registry system 300 may respond to requests for a particular user identifier by providing a listing of the locations of the transaction log 318 for that user. Additionally, the registry system 300 may include the public key for that user. Similarly, when queried with the identifier of a digital good, the registry system 300 may respond with the identifier of the original author and the registration date. For example, given a user ID, (e.g. via http://registry.sharefair.org/H(A)), the registry responds with an XML document <user id=H(A)><public_key>xxxx</public_key><transaction_log>yyyy</transaction_log> . . . other user info . . . </user>. When given the ID of a work H(G), the registry responds similarly <good id=H(G)><author>H(A)</author><registered_date>yyyy-dd-mm-hh-mm-ss</registered_date> . . . other info . . . </good>. The transaction log module 304 associated with the registry system 300 stores registration transactions, for example the registration of a new user ID or the registration of a work G. Note that all transaction log modules 104A, 104B, 304, 404 should respond to requests for their posted transactions with a list of transaction ID's. Those requests and the results might be limited to some particular time interval or a particular transaction ID.

The Clearinghouse System 400 comprises a transaction log module 404, an account module 405, and an audit module 406 to verify the status of transactions and maintain user account information. These modules 404, 405 and 406 are coupled to a bus for communication with each other and the other systems 100A, 100B, 300, 400.

Each of the systems 100A, 100B, 300, 400, and 900 includes one or more modules of the present invention. The system 50 includes at least seven different modules including the hash module 900, the content module 102A, 102B, the transaction generator module 103A, 103B, the transaction log module 104A, 104B, 304 and 404, the pricing module 101A, 101B, the account module 305, 405, and the audit module 406.

The hash module 900 is a device for generating a unique alphanumeric string (a "hash") to represent a digital work. The hash string is notated h(x), where x is a digital representation of the work to which the hash function is applied.

The content module 102A, 102B is a device by which the work produced by a given individual is stored in a repository and made available.

The transaction generator module 103A, 103B is a device by which a transaction representing the exchange of work or currency between two parties is created and sent to a transaction log module 104A, 104B, 304 and 404.

The transaction log module 104A, 104B, 304 and 404 is a device by which a given party's transactions are tracked, stored, and made available.

The pricing module 101A, 101B is a device for determining the cost of the right to distribute or modify a digital work.

The account module 305, 405 is a device by which the accounts of parties affected by a transaction are settled.

The audit module 406 is a device by which the validity of a transaction is ascertained by comparing each participant's record of said transaction.

Figure 2:
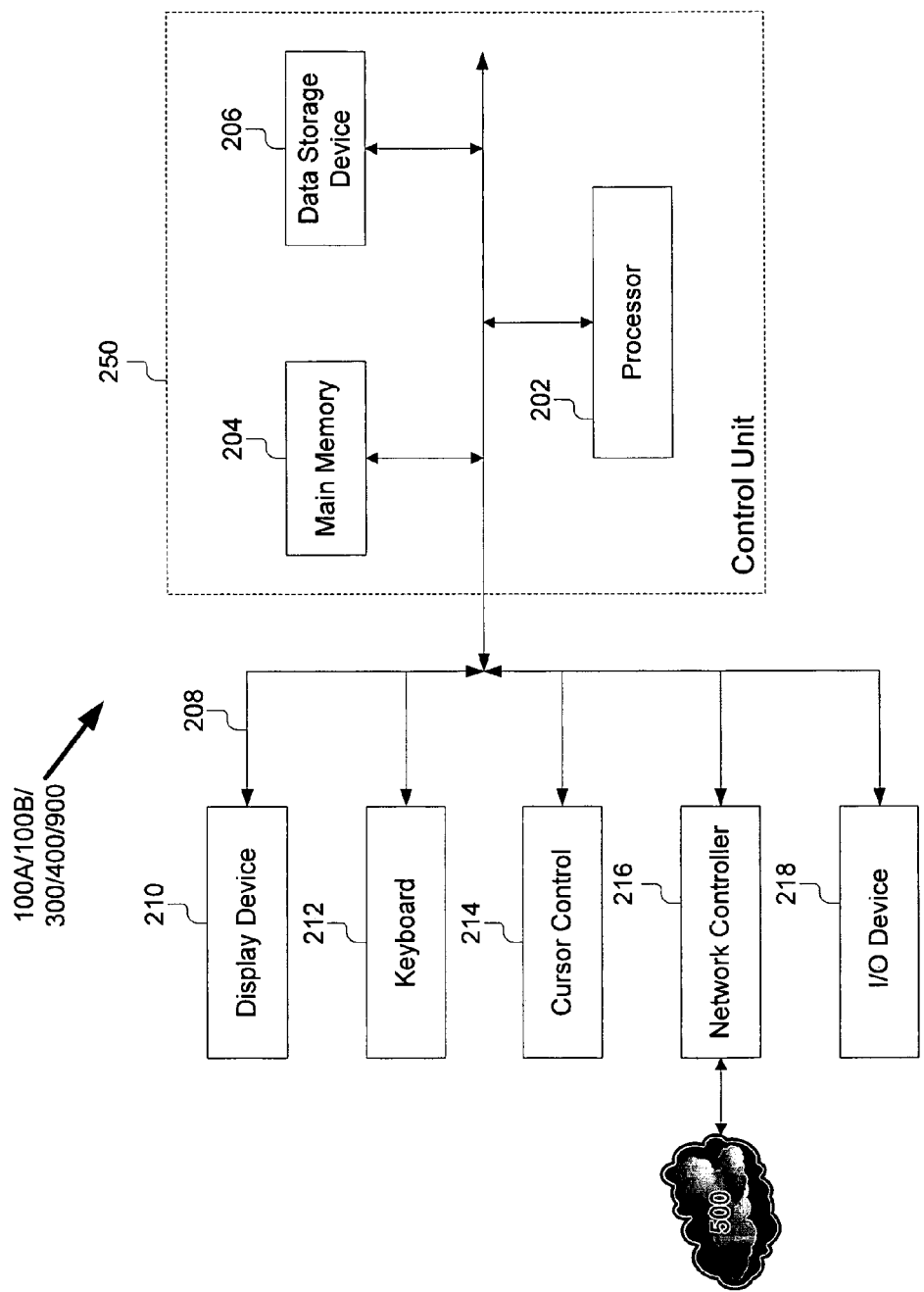
FIG. 2 is a block diagram of another embodiment of a system forming a portion of the exchange system in accordance with the present invention.
Figure 3:
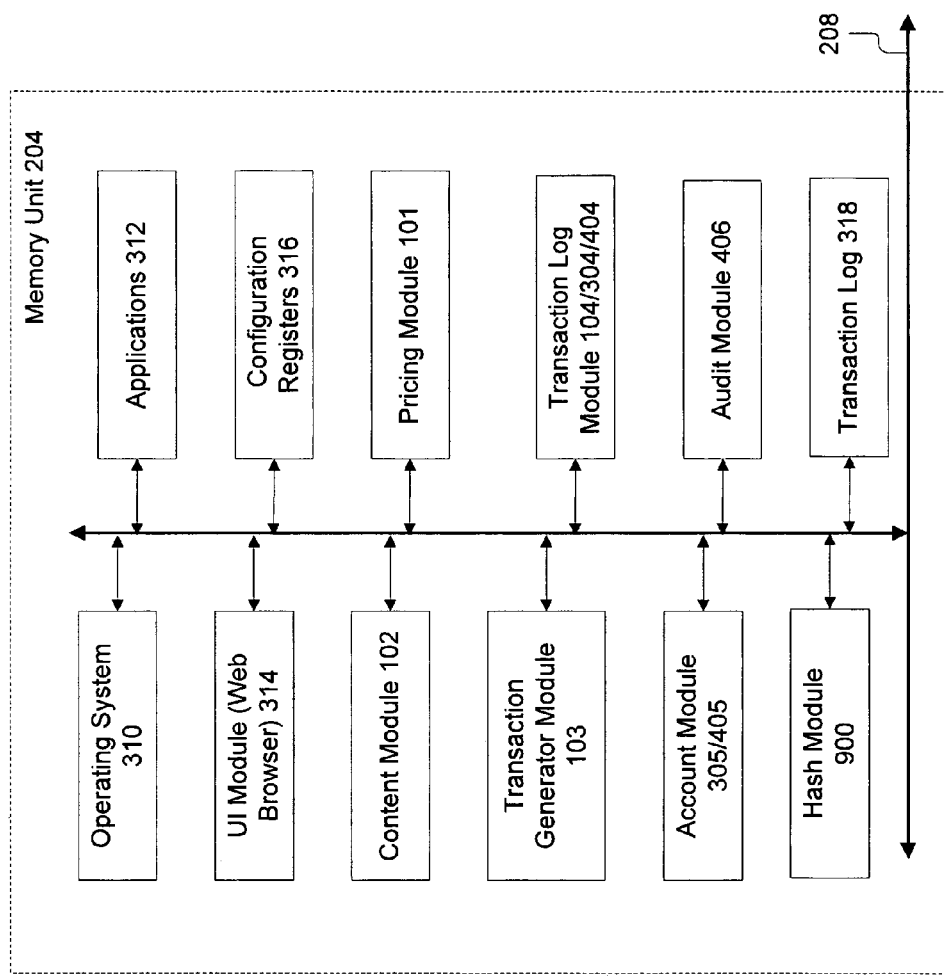
FIG. 3 is a block diagram of one embodiment of a memory for the system of FIG. 2.

Referring now to FIG. 2, the functionality for the systems 100A, 100B, 300, and 400 in accordance with a preferred embodiment of the present invention is shown. Any of the systems 100A, 100B, 300, and 400 may include all or some of the functionality described below with reference to FIGS. 2 and 3, and operate on a computer or server enhanced with some of the functionality described below. However, each system 100A, 100B, 300, and 400 may only include the modules as described above with reference to FIG. 1B plus other necessary functionality as will be understood to those skilled in the art. For example, the registry system 300 and the clearinghouse system 400 need not have all the modules listed below while the user system 100A, 100B may not have other modules necessary for operation of the registry system 300 and the clearinghouse system 400. However, those skilled in the art will understand that the description of an embodiment of a system in FIGS. 2 and 3 represents a superset of all functionality available in any of the systems. Moreover, while the description below focuses on an exemplary user system 100, the descriptions are applicable to the other systems including the same or similar functionality.

The system 100 comprises a control unit 250, a display device 210, a keyboard 212, a cursor control device 214, a network controller 216 and an input/output (I/O) device 218.

Control unit 250 may comprise an arithmetic logic unit, a microprocessor, a general purpose computer, a personal digital assistant or some other information appliance equipped to provide electronic display signals to display device 210. In one embodiment, control unit 250 comprises a general purpose computer having a graphical user interface, which may be generated by, for example, a program written in Java running on top of an operating system like WINDOWS® or a UNIX®-based operating system. In one embodiment, one or more application programs are executed by control unit 250 including, without limitation, word processing applications, electronic mail applications, financial applications, and web browser applications.

Still referring to FIG. 2, the control unit 250 is shown including processor 202, main memory 204, and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3. In particular, the portions of the memory 204 for providing the exchange system 50 will be described. Such functionality will include the registration, exchange, authorization and auditing of transactions, and other features of the present invention.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the keyboard 212, the cursor control device 214, the network controller 216 and the I/O device 218.

Display device 210 represents any device equipped to display electronic images and data as described herein. Display device 210 may be, for example, a cathode ray tube (CRT), liquid crystal display (LCD), or any other similarly equipped display device, screen, or monitor. In one embodiment, display device 210 is equipped with a touch screen in which a touch-sensitive, transparent panel covers the screen of display device 210.

Keyboard 212 represents an alphanumeric input device coupled to control unit 250 to communicate information and command selections to processor 202.

Cursor control 214 represents a user input device equipped to communicate positional data as well as command selections to processor 202. Cursor control 214 may include a mouse, a trackball, a stylus, a pen, a touch screen, cursor direction keys, or other mechanisms to cause movement of a cursor.

Network controller 216 links control unit 250 to a network 500 that may include multiple processing systems. The network 500 of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the system bus 208. For example, the I/O device 218 may be an audio input/output device 218 equipped to receive audio input via a microphone and transmit audio output via speakers. In one embodiment, audio device 218 is a general purpose audio add-in/expansion card designed for use within a general purpose computer system. Optionally, I/O audio device 218 may contain one or more analog-to-digital or digital-to-analog converters, and/or one or more digital signal processors to facilitate audio processing.

It should be apparent to one skilled in the art that control unit 250 may include more or less components than those shown in FIG. 2 without departing from the spirit and scope of the present invention. For example, control unit 250 may include additional memory, such as, for example, a first or second level cache, or one or more application specific integrated circuits (ASICs). Similarly, additional components input/output devices 218 may be coupled to control unit 250 including, for example, image scanning devices, digital still or video cameras, or other devices that may or may not be equipped to capture and/or download electronic data to control unit 250.

FIG. 3 is a block diagram of one embodiment of the memory 204 for the user system 100. The memory 204 comprises an operating system 310, one or more application programs 312, a user interface (UI) module 314, one or more configuration registers 316, the content module 102, the pricing module 101, the transaction generator module 103, the transaction log module 104, 304 or 404, the account module 305, 405, the audit module 406, the hash module 900 and a transaction log 318. As noted above, the memory unit 204 stores instructions and/or data that may be executed by processor 202. The instructions and/or data may comprise code for performing any and/or all of the techniques described herein. These modules are coupled by bus 208 to the processor 202 for communication and cooperation to provide to the system 50. Those skilled in the art will recognize that while the present invention will now be described as modules or portions of a memory unit 204 of a computer system, the modules or portions may also be stored in other media such as permanent data storage device 206 and may be distributed across a network having a plurality of different computers such as in a client/server environment.

The operating system 310 is preferably one of a conventional type such as WINDOWS®, SOLARIS® or LINUX®-based operating systems.

The memory unit 204 may also include one or more application programs 312, including, without limitation, word processing applications, electronic mail applications, financial applications, and web browser applications.

Figure 9:

The memory unit 204 also includes a user interface module 314 for generating displays representing the transaction as will be described below. For example, the user interface module 314 may be a web browser such as Mozilla from Netscape or Internet Explorer from Microsoft. The user interface module 314 is coupled to the content module 102, the account module 305, and the transaction log module 104 to aggregate and present information from the exchange system 50 and present it to the user. The user interface module 314 preferably includes programs for presenting and displaying information from the exchange system 50 and accepts input and actions relating to digital goods. For example, the user interface module 314 may present to the user a graphical display of the works accessible to that user such as shown in FIG. 9. FIG. 9 is a graphical representation of a matrix type display 902 for presenting to the user digital goods that are available in the exchange system 50. The matrix type display 902 advantageously includes a column of basic information about a work or good that is available and additional columns for different rights that may be purchased with regard to the work. It should be noted that the prices for such different options may be, as shown, offered in different currencies. Also, the works are preferably ordered by value to Bob or the particular user. The value is related to all transactions for a work that involve group members of groups that Bob is in. Referring now also to FIG. 10, another interface provided by the user interface module 314 is shown. FIG. 10 is a graphical representation of an interface for displaying the account balances of a group of users associated with a registry. The matrix 1000 shows all of the accounts from an account module 305 and all the denominations or service obligations represented as a matrix. For example in FIG. 10, it can be seen that B owes A 7 hours of service and A owes B 3 hours of service. If they value each other's time equally, they could do a currency exchange with the net result of B owing A 4 hours. In the case where there is a one-to-one correspondence between the types of currency and the account holders, the account balances can literally be represented as single matrix, e.g. an N-by-N array where N is the number of accounts. Those skilled in the art will recognize that the user interface module 314 may include various other interfaces that allow the user to interact with the modules that form the exchange system 50 of the present invention.

The memory unit 204 also includes a number of configuration registers 316 that can be used in a conventional manner to set the operating configuration of the user systems 100A, 100B, the registry system 300 and the clearinghouse system 400.

The memory unit 204 may also include one or more transaction logs 318. These transaction logs 318 are databases to store transaction records in one embodiment. They may alternatively be part of the data storage 206. There may be a transaction log 318 corresponding to each user, each system or each transaction log module 104A, 104B, or any variety of combinations of users, systems and transaction log modules. Some exemplary logs are provided in Appendix A.

Hash Module 900

The hash module 900 generates a unique alphanumeric string (a "hash") to represent a digital work. The hash module 900 has an input to receive a binary representation of some object from a user or module. The hash module 900 computes the hash value or hash identifier of the object by applying a hash function to its digital representation. The hash module 900 employs a widely known one-sided hash function such as MD5 or SHA1 to parse a digital object and return a unique alphanumeric sequence as an output. The hash module 900 outputs this hash value back to the requesting user or module.

In an example use of the invention, the output of the hash module 900 can be used by multiple parties to exchange emails without revealing any partys's true email address. For example, Alice can post a message to Bob's log that will be sent to him as an email. When it arrives, her email address appears to Bob as an alphanumeric string such as 1950e1e61ee70909837e454fbe565c74 (the hexadecimal representation of the MD5 hash of alice@mail.server.com).

In order to respond to Alice's email, Bob obtains the location of Alice's log by querying the registry with the aforementioned alphanumeric string. When Bob, in turn, posts a response on Alice's log, his message is sent to Alice, with his email address likewise appearing only in its hashed representation. Bob and Alice can thus have an email exchange without ever revealing their true email addresses.

This anonymity can be vacated at the discretion of the users, since knowledge of the original digital object allows for the computation of the corresponding hash string. For example, if Bob knows Alice's true email address, his client can automatically compute its hash and check it against the hashes of incoming messages. When Alice sends him an email, the two hashes will match and the true email address (alice@mail.server.com) can be displayed.

Content Module 102

The content module 102 stores digital works and makes them available as needed to other users. A user sends a digital work to the content module 102. The content module 102 sends the digital work to the hash module 900. The hash module 900 generates a hash string corresponding to the work, and sends it back to the content module 102. The content module 102 stores the work and its corresponding hash in a database, such as data storage device 206. In one embodiment, the data itself is stored in the database as a binary object, for example as shown in Table 1.

TABLE 1

| Identifier - H(G) | Digital Work |
| --- | --- |
| 1a2b3c4 . . . | 0101111011 . . . |

In an alternate embodiment, the data is stored in a file in a conventional file system and the path or universal resource locator (URL) of that file is stored in the database, for example as shown in Table 2.

TABLE 2

| Identifier - H(G) | Digital Work |
| --- | --- |
| 1a2b3c4 . . . | /dir/path/file.ext |

The content module 102 sends a confirmation to the user that the work has been stored successfully. In both embodiments, a user or module (requester) may attempt to retrieve the work by sending a query with a key to the content module 102. In one embodiment, if the key matches a record, the content module 102 retrieves the digital work or good from the location specified in the record and returns it to the requester.

In an alternate embodiment, if the key matches a record, the content module 102 sends a query with a key consisting of the union of the work's hash value and the requester's identifier to the transaction log module 104, 304, 404. In one version of this embodiment, the transaction log module 404 is in the clearinghouse system 400. In another version of this embodiment, the transaction log module 104 is in the system of the user distributing the work. In both versions of this embodiment, if the query matches a result, the transaction log module 104, 404 being queried sends a notice of acceptance to the content module 102. The content module 102 then sends the work to the requester. If the query does not match a result, the transaction log module 104, 404 being queried sends a notice of rejection to the content module 102. The content module 102 sends a message to the requester denying access to the work.

In an example use of the invention, Alice is the owner of an audio file. She uploads the file to a content repository on a remote server (not shown) via a client-side user interface such as a web browser. The content module 102 uses the hash module 900 to generate a hash of the audio file, which is stored along with the audio file itself in a database on the remote server. A confirmation of the successful file transfer is returned to Alice's web browser along with the alphanumeric hash string.

When Bob wishes to access Alice's audio file, he sends the hash string to the content module 102 by clicking on a hypertext link in his web browser. If Alice has chosen to limit access to the file to those who have paid for it, the content module 102 will check the transaction log of the clearinghouse system 400 to verify that Alice's log has a record of exchanges giving Bob access to the file (for example, Bob paying for the work). If he has paid for it, the content module 102 sends the file to him; if he has not paid for it, the content module 102 sends him a message denying him access.

If Alice has not chosen to limit access to the file, the content module 102 sends the audio file to Bob as soon as it receives the corresponding hash string.

Transaction Generator Module 103

The transaction generator module 103 generates transaction records and provides them to the transaction log module 104, 304 or 404 and the audit module 406. In a first embodiment of the transaction generator module 103, some amount of currency is transferred from a debit account to a credit account. In one version of this embodiment, a user sends 1) the identifier of a credit-account holder, 2) the identifier of a debit-account holder, 3) a denomination of currency to be transferred, 4) the amount of currency to be transferred, and 5) the date to the transaction generator module 103. In an alternate version of this embodiment, there may be multiple denominations of currency with different amounts of each denomination. The user specifies the denominations and the amount of each to be transferred. In yet another version of this embodiment, each account may have a denomination debited from it and credited to the other account. The user creating the transaction record specifies which account will be credited with what amount of which denomination.

In a second embodiment of the transaction generator module 103, the currency is transferred from the debit account to the credit account in exchange for a digital work. In one version of this embodiment, in addition to the above information, the user also sends the hash of the work being transacted. In an alternate version of this embodiment, the user only sends the identifier of the credit-account holder, the identifier of the debit-account holder, the hash of the work being transacted, and the date.

The transaction generator module 103 sends this information to the pricing module 101. The pricing module 101 returns the denomination or denominations of currency to be used and the amount of each currency to be transferred. The transaction generator module 103 adds this information to the transaction record. T={H(C),H(D),H(G),Den,Amt,date}

In an alternate embodiment, the transaction generator module 103 is configured specifically for an individual user account. The user sends the identifier of the work being transacted, H(G). The transaction generator module 103 sets the debit account as the user's account, then the employs the registry to obtain the account information of the owner of the work and sets that account as the credit account, and obtains the pricing information from the pricing module.

In an alternate embodiment, the transaction generator module 103 also adds a reference, R, to the transaction directly preceding it in the work's transaction chain.

The transaction generator module 103 may employ the hash module 900 to compute the hash of the completed transaction record. The transaction generator module 103 sends the transaction record to the user for confirmation. The user sends confirmation or denial of the transaction to the transaction generator module 103.

The user or the community may set rules under which a transaction is automatically confirmed, denied, or sent to the user for decision-making. If the transaction is denied, the transaction generator module 103 sends a notice of denial to the other party in the transaction. If the transaction is confirmed, the transaction generator module 103 sends the completed transaction to the transaction log modules 104, 304 or 404 of the credit-account holder and the debit-account holder. In an alternate embodiment, the transaction generator module 103 also sends the completed transaction to the audit module 406.

Figure 7:
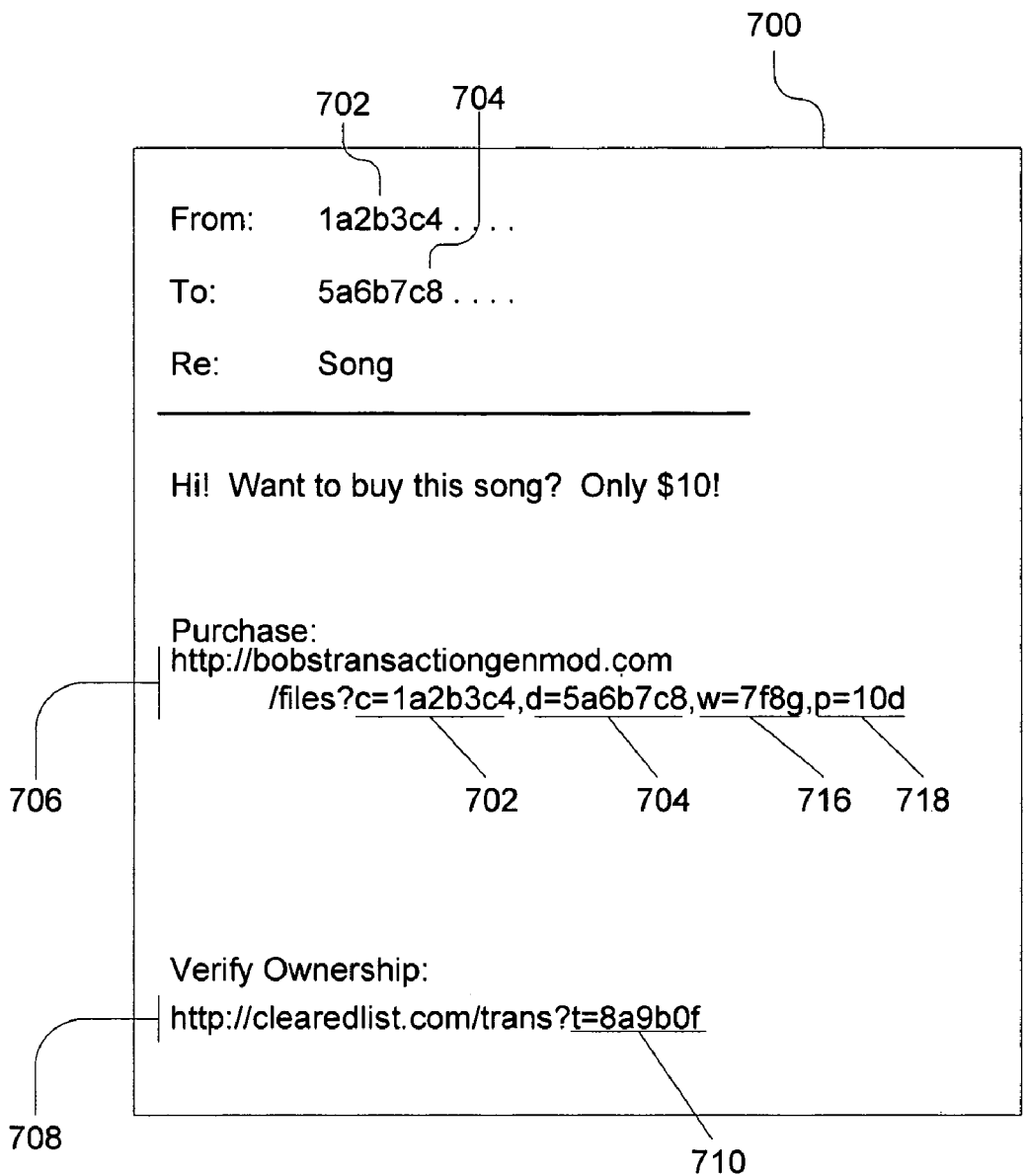
FIGS. 7 and 8 are graphical representations of emails used in conjunction with the transaction log module according to the present invention.

In one example use of the invention, Alice is the owner of an audio file. Alice sends Bob an email 700 offering him the file at a price of $10. As seen in FIG. 7, included in the email 700 are two hypertext links 706, 708: one is a link 706 to Bob's transaction generator module 103 encoded with Alice's identifier 702, Bob's identifier 704, the hash of the work 716, and the price of the work 718; the other is a link 708 to the cleared list transaction log module encoded with the hash of the transaction 710 that gave Alice ownership of the file.

Bob clicks on link 708 and receives confirmation that Alice is indeed the legitimate owner of the work. He decides to accept her offer, and clicks on link 706, which sends Alice's identifier 702, Bob's identifier 704, the hash of the work 716, and the price of the work 718 to his transaction generator module 103.

Bob's transaction generator module 103 employs the hash module 900 to compute the hash corresponding to the entered transaction record. The transaction generator module 103 sends the original transaction record along with its hash string to Alice's and Bob's transaction log modules 104A, 104B and to the audit module 406.

Figure 8:
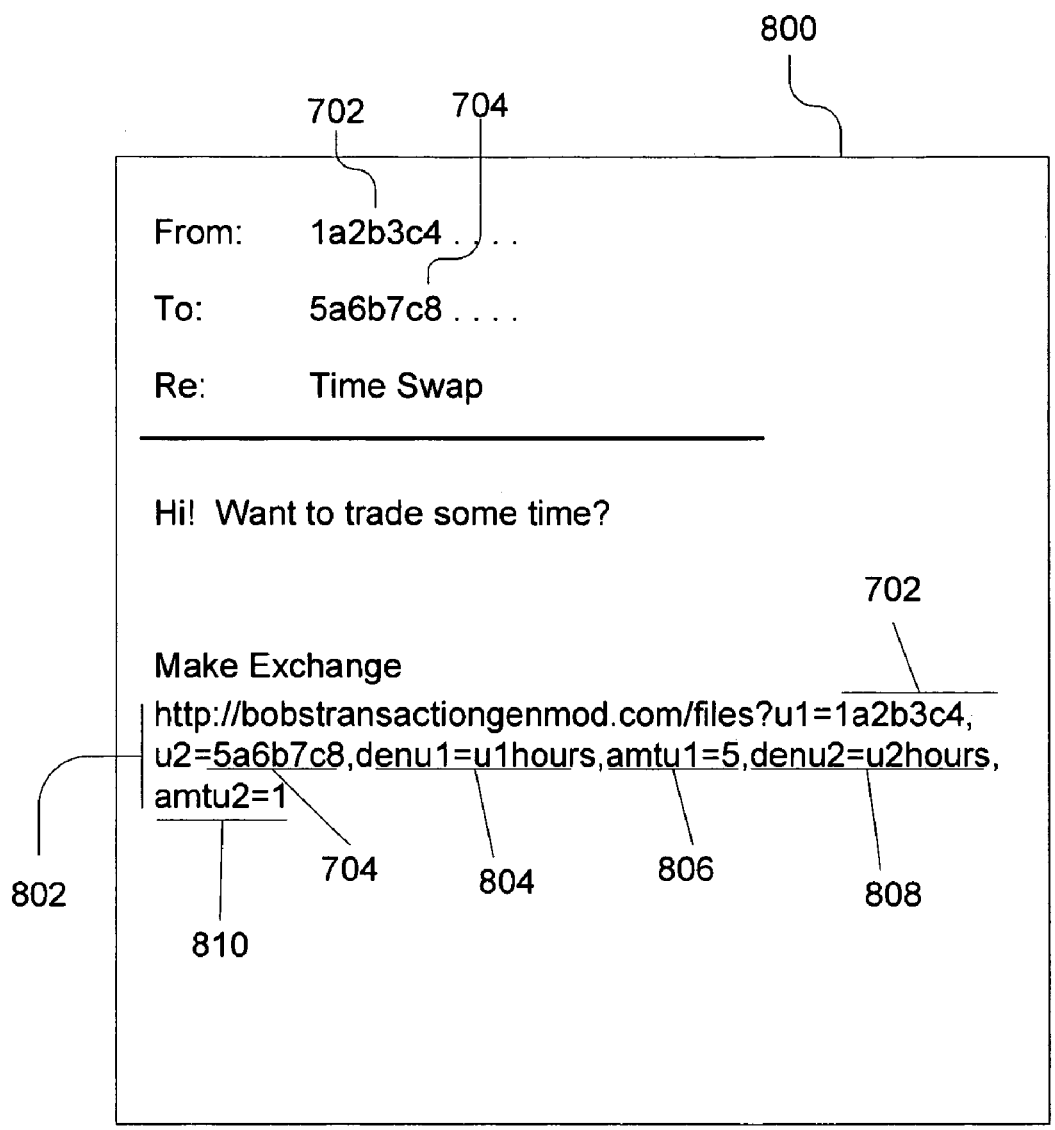

In another example use of the invention, Alice sends Bob an email 800 offering him 5 hours of her time in exchange for 1 hour of his time. The exchange of time need not be 1-to-1; it may often be the case that one user's time is more valuable than the other's. Note also that, as with traditional forms of currency, exchange rates can fluctuate. For example, in this example Alice may be a doctor and Bob may be a plumber. Bob is feeling fine, and thus does not value Alice's time very highly. Alice, however, has a leak flooding her house, and thus values Bob's time quite highly indeed. One can easily imagine a different situation with the same two parties in which the reverse could be true: for example, when Alice's pipes are fine and Bob is stuck in bed with the flu. As seen in FIG. 8, included in the email 800 is a hypertext link 802 to Bob's transaction generator module 103 encoded with Alice's identifier 702, Bob's identifier 704, the denomination to be deducted from Alice's account 804, the amount to be deducted from Alice's account 806, the denomination to be deducted from Bob's account 808, and the amount to be deducted from Bob's account 810. Bob decides to accept her offer, and clicks on link 802, which sends Alice's identifier 702, Bob's identifier 704, the denomination to be deducted from Alice's account 804, the amount to be deducted from Alice's account 806, the denomination to be deducted from Bob's account 808, and the amount to be deducted from Bob's account 810 to his transaction generator module 103.

Bob's Transaction generator module 103 employs the hash module 900 to compute the hash corresponding to the entered transaction record. Bob's transaction generator module 103 sends the original transaction record along with its hash string to Alice's and Bob's transaction log modules 104A, 104B.

Transaction Log Module 104A, 104B, 304 or 404

The memory 204 also includes a transaction log module 104A, 104B, 304 or 404 and maintains lists of transaction records and makes records available to the account module 305, 405, the audit module 406, and users. An instance of the module 104A, 104B, 304 or 404 is present in the first user system 100A, the second user system 100B, the registry system 300 and the clearinghouse system 400, respectively. Here for ease of understanding, only the transaction log module 104 for the user systems 100 will be described, but the transaction log modules 304, 404 of the registry system 300 and the clearinghouse system 400 have a similar form and functionality.

In one embodiment, the transaction log module 104 receives a transaction record from one of the transaction generator modules 103A, 103B, the audit module 406, or a user (the "sender"). The transaction log module 104 employs the hash module 900 to compute the hash of the transaction, H(T). Alternatively, the sender may also supply the transaction log module 104 with the hash of the transaction record. The transaction log module 104 stores the values of the transaction along with the hash of the record in a database. An exemplary such record stored by the transaction log module 104 is shown in Table 3.

TABLE 3

| H(T) | H(C) | H(D) | H(G) | Den | Amt | Date |
|---|---|---|---|---|---|---|
| 5a6b7 . . . | 0c0d1 . . . | 0e0a2 . . . | 0b0c3 . . . | $ | 15 | YYYY/MM/DD |

A user or module may query the transaction log module 104 with a key. The transaction log module 104 returns the entries associated with the key provided by the user. If the key matches a unique entry, the transaction record is returned to the requester. If the key matches multiple entries, all matching transaction records are returned to the requester. In alternate embodiments, the users in a system may limit the situations under which the transaction log module 104 returns an entry or entries in response to a query.

In another embodiment, the transaction log module 104 receives the hash of a transaction record from the transaction log module 104A, 104B, the audit module 406, or a user, and may perform authentication using the hash. The transaction log module 104 stores the hash of the transaction record in a database, as shown by way of example in Table 4.

TABLE 4

| H(T) |
|---|
| 5a6b7 . . . |

A user or module may query the transaction log module 104 with the hash of the transaction record. If the hash sent by the requester matches a hash contained in the database, the transaction log module 104 sends the requester notice that the hash exists. If the hash sent by the requester does not match a hash contained in the database, the transaction log module 104 sends the requester notice that the hash does not exist. Again, the users may limit the situations under which the transaction log module 104 responds to a query. The transaction log module 104 may also respond to a query for the transaction records in a given timeframe. The transaction log module 104 returns a list of all transaction records that correspond to the specified timeframe. For such queries, the transaction log module 104 also returns a "Start Number" and an "End Number" corresponding to a specified interval. Preferably, the End Number is a hash of the Start Number along with all of the transactions in the list, signed with the private key of the user. In one version of this embodiment, this timeframe query is repeated periodically. The End Number of each set of records becomes the Start Number for the subsequent set of records. The transaction record maintained by the transaction log module 104 may also include any variety of other parameters. For example the transaction record may include a status field marking the records as "Pending," "Posted," "Cleared," or "Denied." "Pending" refers to transactions in which the parties' accounts have not yet been balanced and the information on the transaction log is not publicly available. "Posted" refers to transactions in which the parties' accounts have not yet been balanced and the information on the transaction log is publicly available. "Cleared" refers to transactions in which the parties' accounts have been balanced and the information on the transaction log is publicly available. When a transaction is first received, the transaction log module 104 sets the status to "Pending." The transaction log module 104 stores the status of the transaction in the record in a status field. An exemplary group of records is shown in Tables 5 and 6.

TABLE 5

| H(T) | H(C) | H(D) | H(G) | Den | Amt | Date | Status |
|---|---|---|---|---|---|---|---|
| 5a6b7 . . . | 0c0d1 . . . | 0e0a2 . . . | 0b0c3 . . . | $ | 15 | YYYY/MM/DD | Pending |

TABLE 6

| H(T) | Status |
|---|---|
| 5a6b7 . . . | Pending |

The transaction log module 104 periodically examines and changes the status field according to the criteria specified by the transaction log module's owner. If the owner's account is listed as the debit account and the price is below some threshold, the transaction log module 104 may automatically change the status from Pending to Posted. If the owner's account is listed as the credit account, the transaction log module 104 may automatically change the status from Pending to Posted. Alternatively, the transaction log module 104 may check with the transaction log module of the debit account and confirm that the transaction has been posted by that transaction log module before changing the status to Posted.

In another version of this embodiment, the transaction log module 104 corresponding to the debit account may require authorization from its owner before making the change. If the owner approves the change, she sends authorization back to the transaction log module 104, preferably in the form of a private key. The transaction log module 104 changes the Status Field. If the owner does not approve the change, the transaction log module 104 sends a notice of denial to the user or modules attempting to verify transaction information.

In the case of the clearinghouse system 400, the transaction log module 404 may change the status from Posted to Cleared upon receipt of notification from the account module 405 that the balances for the credit and debit accounts have been updated. The individual account holders or user transaction log modules 104A, 104B may periodically poll the clearinghouse transaction log module 404 for the status of Pending transactions. The individual user transaction log modules 104A, 104B change the status of a transaction to Cleared when they receive confirmation from the clearinghouse transaction log module 404 that the transaction has cleared.

Alternatively, individual account holders may maintain their own running balances or individual account modules. In this case, the transaction log modules 104A, 104B may poll the transaction log 318 of the account corresponding to the other party of the transaction. If the transaction log module associated with the debit account lists a transaction as either posted or cleared, then the transaction log module associated with the credit account would change the status of the transaction from Posted to Cleared after getting confirmation from the individual account module that the balance has been updated. Likewise, the debit account would change the status from Posted to Cleared if the credit account transaction log module lists the transaction as Posted or Cleared and the account module confirms the balance uptake. Note that once posted, transactions cannot be removed from the transaction log module 104 nor can their status be changed to anything other than Cleared. In cases where a transaction must be "undone," for example because one of the parties does not hold up their end of the agreement, an offsetting transaction must be generated and posted to the appropriate transaction log modules. Once that offsetting transaction has posted and cleared, the owner of the transaction log module could then manually confirm a status change for the Posted transaction to Cleared. Also note that only Posted and Cleared transactions would figure in the calculation of the above mentioned Start and End numbers. (The status information itself, e.g. Posted or Cleared, is not included in these calculations.)

In another embodiment of the module, users may maintain private transaction records in which the individuals involved in the exchange and the good being transacted are not visible to the outside world. An exemplary record for such non-visible transactions is shown in Table 7.

TABLE 7

| H(T) | Den | Amt | Date | Status |
|------|-----|-----|------|--------|
| 5a6b7 . . . | $ | 15 | YYYY/MM/DD | Cleared |

In an example use of the invention, Alice has sold Bob an audio file. The transaction log module 104A receives a record of the transaction (containing Alice's ID, Bob's ID, the ID of the file, the price paid by Bob to Alice, and the date), as well as the hash corresponding to the record. The transaction log module 104A stores this information in a database.

Later, Bob sends Carol an email offering to sell her the same audio file. Carol would like to buy the file, but would like to first verify that Bob purchased it legitimately from Alice. Carol sends a query through her web browser to the Cleared List transaction log module 404 using the hash of the audio file as the key. She does not see record of the work being transacted between Alice and Bob, so she queries Bob's transaction log module 104B using the same key.

Bob's transaction log module 104B returns a transaction record, which is still marked "Posted" because it has not yet been cleared. Carol then queries Alice's transaction log module 104A, once again with the same key, and receives back an identical transaction record, also marked "Posted." As a result, Carol can conclude that the transaction was legitimate, and agrees to buy the audio file from Bob.

A few days later, the clearinghouse system 400 performs its weekly account balancing function. The audit module 406 sends queries to Alice's and Bob's transaction log modules 104A, 104B asking for all transaction records in the past seven days. Both modules 104A, 104B return all corresponding transaction records, including the record for the audio file.

Subsequently, Bob receives notification from the audit module 406 that the account balances have been updated and the status should be changed from "Posted" to "Cleared." Bob reviews the details of the transaction record online and approves the change by sending his approval with a secret password to his transaction log module 104B. Alice, on the other hand, had previously decided to allow such changes to take place automatically, and therefore receives no notification when the status of the transaction is changed from "Posted" to "Cleared" on her transaction log module 104A.

Later, Carol sends David an email offering to sell her the same audio file. David would like to buy the file, but would like to first verify not only that Carol purchased it legitimately from Bob, but also that Bob and anyone else in the transaction chain owned the file legitimately themselves. David sends a query through his web browser to the Cleared List transaction log module 404, using the hash of the audio file as the key. All records on the Cleared List pertaining to the file in question are returned, enabling David to trace the transactional history of the work back to its registration, thereby verifying the legitimacy of its ownership status.

Audit Module 406

The audit module 406 verifies the integrity of transactions, updates a shared list of "cleared" transactions, and, if necessary, initiates a conflict resolution process. The audit module 406 is coupled for communication with other modules 404, 405 of the clearinghouse system 400 and other systems 100, 300. The audit module 406 performs three primary functions: 1) obtaining records, 2) auditing records upon user request, and 3) batch auditing of records. Each will be discussed in turn below.

The audit module 406 obtains records of transaction so that they can be reconciled. The audit module 406 receives the hash of a transaction record from the transaction generator module 103A, 103B, or a user (the "sender"). The audit module 406 may alternatively receive the transaction record itself from the transaction generator module 103A, 103B, or a user (the "sender"). The audit module 406 communicates with the hash module 900 to compute the hash of the transaction record. The audit module 406 queries the registry's transaction log module 304 with the identifiers of the parties involved in the transaction. The registry's transaction log module 304 returns the location of the parties' logs 318. The audit module 406 communicates with the parties' transaction log modules 104A, 104B to retrieve their respective transaction records. If the records from both transaction log modules 104A, 104B list the transaction in question (that is, the records both include an entry for H(T)) the audit module 406 proceeds with the auditing and accounting process. If, after some specified period of time following the initiation of the transaction, for example one day, the record of the transaction does not appear on one or the other transaction log 318, the audit module 406 initiates a conflict resolution process.

Once the transaction records are obtained, they can be reconciled. This can either be done on a record-by-record basis or as a batch job. For auditing one record, the audit module 406 queries the credit-account holder's transaction log module 104A with the hash of the transaction record. If the audit module 406 receives confirmation that the hash of the transaction record is present on the credit-account holder's transaction log 318, the audit module 406 queries the debit-account holder's transaction log module 104B with the same hash. If the audit module 406 receives confirmation that the hash of the transaction record is also present on the debit-account holder's transaction log 318, the audit module 406 sends the transaction record to the account module 405 for account balancing. In one embodiment, the audit module 406 sends the hash of the transaction record to a transaction log module 404 for a shared list of "cleared" transactions. In an alternate embodiment, the audit module 406 first sends the hash of the transaction record to a transaction log module 404 for a shared list of "posted" transactions. The account module 405 sends confirmation to the audit module 406 once each user's balance has been updated. The audit module 406 then sends the hash of the transaction record to a transaction log module 404 for addition to a cleared transactions list. In alternate versions of both embodiments, the transaction record itself is also sent to the cleared and posted list of the transaction log module 104A, 104B. In both embodiments, if the hash of the transaction record is missing from either account-holder's log, the audit module 406 initiates a conflict resolution process.

The transaction records can also be reconciled in batch. In another embodiment, the audit module 406 adds the hash of the transaction record to a list of hashes of pending transactions. Periodically, the audit module 406 communicates with the user transaction log modules 104A, 104B to retrieve all transactions appearing on the user's log during a certain time interval. In the preferred version of this embodiment, this interval is the period of time between the present date and the most recent date that the audit module 406 performed this function. In the preferred version of this embodiment, the interval is identified through the use of a "Start Number" and "End Number." For each transaction, t, the audit module 406 checks the user's record for the other user listed in the exchange. The audit module 406 then retrieves from local storage the batch of transactions received from the transaction log module 104B of the second user and searches for the corresponding transaction identifier, t. If the audit module 406 receives confirmation that the hash of the transaction record is contained in the lists of transactions retrieved from both user's transaction logs, the audit module 406 sends the transaction record to the account module 405 for account balancing. In one embodiment, the audit module 406 sends the hash of the transaction record to the transaction log module 404 for a shared list of "cleared" transactions. In another embodiment, the audit module 406 first sends the hash of the transaction record to the transaction log module 404 for a shared list of "posted" transactions. The account module 405 sends confirmation to the audit module 406 once each user's balance has been updated. The audit module 406 then sends the hash of the transaction record to the transaction log module 404 for a cleared transactions list. In alternate embodiments, the transaction record itself is also sent to the cleared and posted list transaction log modules 404. If the hash of the transaction record is missing from either account-holder's log, the audit module 406 initiates a conflict resolution process. In the preferred version of this embodiment, this process is repeated for all users in a community.

Those skilled in the art will recognize that the audit module 406 can be operated to periodically perform auditing functions. For example, the audit module 406 may operate very often (e.g. once a minute, hourly, daily) in addition to weekly.

In an example use of the invention, the audit module 406 receives a record of a transaction between Bob and Alice, in which Alice sold Bob an audio file at a certain price on a certain date. The audit module 406 retrieves the locations of Alice's and Bob's transaction log modules 104A, 104B by querying the registry's transaction log module 304 with each individual's identifier.

The audit module 406 then generates a hash of the transaction record and compares it to the corresponding hashes on Bob's and Alice's transaction logs 318. Since all the hashes match, the audit module 406 sends the transaction record to the account module 405 so that the accounts can be balanced. The audit module 406 then sends notification to Alice's and Bob's transaction log modules 104A, 104B that the status of the transaction should be marked as "Posted."

A few days later, the clearinghouse system 400 performs its weekly account balancing function. The audit module 406 obtains the past week's transaction records, including the transacted audio file, from Alice's and Bob's transaction log modules 104A, 104B. The audit module 406 sends the transactions to the account module 405, which returns a notice to the audit module 406 when all of the accounts have been balanced.

The audit module 406 then notifies Alice's and Bob's transaction log modules 104A, 104B that the statuses of the audio files transaction should be marked as "Cleared." Finally, the audit module 406 sends the transaction record to the Cleared List's transaction log module for public posting.

Throughout the description of the present invention, the modules 101, 102, 103, 104, 304, 305, 404, 405, 406 are described in terms of "sending" information to and from each other. Those skilled in the art will recognize that this can be accomplished in any number of ways including one module polling another module for the information, and that the process of sending the information need not be initiated by the sender. For example, the transaction log module 104A can poll the audit module 406 on a recurring basis changing the status of transactions to cleared or posted.

Account Module 305, 405

The account module 305, 405 uses data contained in the transaction records to maintain a database with an account for each user. In one embodiment, the account module 305, 405 maintains balances in one denomination of currency. A user's account is comprised of his identifier and his current balance. An example user account is represented in Table 8.

TABLE 8

| Identifier - H(U) | Balance |
|---|---|
| 8a9b0 . . . | 1.00 |

In another embodiment, the account module 305, 405 maintains balances in multiple denominations of currency. A user's account is comprised of fields listing his identifier, the denominations of currency he possesses, and his current balance in each denomination. An example of such a multiple-denomination account is represented in Table 9. Because there may be an unlimited number of currencies, the actual database may not include fields for each user for every currency. Instead, each entry in the database has a "joint" key which is comprised of two fields, the user identifier and the denomination of the currency and then a field maintaining the balance in that currency for that user

TABLE 9

| Identifier - H(U) | Denomination | Balance |
|---|---|---|
| 8a9b0 . . . | $Den_1$ | −5.00 |
| 8a9b0 . . . | $Den_2$ | 47.00 |
| 8a9b0 . . . | $Den_N$ | 1.00 |

Any user or module may query the account module 305, 405 with a key. The key may correspond to an identifier for an account and, optionally, an identifier for one or more denominations of currency. If the key matches a unique account balance, that balance is returned to the requester. If the key matches multiple balances, each balance is returned to the requester. In alternate embodiments, the users in a system may limit the situations under which the account module 305, 405 returns balances in response to queries. In all embodiments, a transaction is received by the account module 305, 405 from the transaction generator module 103A, 103B, the transaction log module 104A, 104B, 304, 404, and/or the audit module 406.

The account module 305, 405 automatically adds the specified amount in the specified denomination to a credit account while subtracting the same from a debit account. In an alternate embodiment, the validity of the transaction record is first verified by the audit module 406. When this has been done, the audit module 406 sends notification to the account module 305, 405 that the account balances are ready to be updated. The account module 305, 405 adds the specified amount in the specified denomination to the credit account while subtracting the same from the debit account. When the account module 305, 405 has updated both accounts, it sends notification to the audit module 406 that the record is ready to be posted on the "cleared" transaction list.

In another embodiment, the audit module 406 maintains a list of "posted" transactions. Periodically, the account module 305, 405 retrieves all transaction records from the "posted" list by querying the list's transaction log module with a date range. For each transaction retrieved from the "posted" list, the account module 305, 405 adds the specified amount in the specified denomination to the credit account while subtracting the same from the debit account. Afterwards, the account module 305, 405 sends notification to the audit module 406 that all of the records whose balances were successfully updated are ready to be posted on the cleared transaction list.

The account module 305, 405 may use a specific process to conduct currency exchanges transactions. In one embodiment, a currency exchange may function as two linked transactions. In the first transaction, the specified amount of the first denomination is subtracted from the first user's account and added to the second user's account. In the second transaction, the specified amount of the second denomination is added to the first user's account and subtracted from the second user's account. In the preferred version of this embodiment, neither transaction will be processed by the account module 305, 405 until both have been publicly posted.

In another embodiment, a currency exchange may function as one transaction with two amounts and denominations transacted simultaneously. In this case, the account module 305, 405 simply updates a matrix with values corresponding to each user's accounts as shown in Table 10.

TABLE 10

|  | $U_1$ | $U_2$ |
|---|---|---|
| $Den_1$ | $+Amt_1$ | $-Amt_1$ |
| $Den_2$ | $-Amt_2$ | $+Amt_2$ |

In an example use of the invention, Alice offers to sell Bob an audio file for $10. Bob is not sure if he can afford it, so he sends a query to the account module 305, 405 with his identifier as the key. When the account module 305, 405 returns his account balance, Bob sees that he has sufficient funds and decides to purchase the file from Alice. Bob completes the transaction record and forwards it to authorize his transaction generator module 103B to send the transaction to Bob and Alice's transaction log 318 and the audit module 406 for verification and public posting.

A few days later, the audit module 406 retrieves transaction listings from Bob's and Alice's transaction log modules 104A, 104B, matches the entries for Bob's purchase, and sends the transaction ID to the account module 305, 405. The account module 305, 405 retrieves the transaction details originally sent by Bob, subtracts $10 from Bob's account, adds $10 to Alice's account, and then sends notice to the audit module 406 that the transaction may be added to the "cleared" list.

In another example use of the invention, Alice is a doctor and Bob is a plumber. Alice offers Bob 5 hours of her time in exchange for 1 hour of his time. Bob queries the account module 305, 405 and sees that he has very little of Alice's time stored in his account. With flu season coming up, Bob decides that it would be a good idea to have some of Alice's time, so he agrees to the transaction.

As described above, the transaction record is processed by the transaction generator module 103B and the audit module 406. Eventually, the account module 405 retrieves it from the "posted" list in order to update Bob's and Alice's balances. The account module 405 deducts 5 hours of Alice's time from her account and posts 5 hours of Alice's time to Bob's account. The account module 405 then deducts 1 hour of Bob's time from his account and posts 1 hour of Bob's time to Alice's account.

It should be noted that in alternate embodiments, there need be only one account module 305/405 either in the registry system 300 or in the clearinghouse system 405. For example, the clearinghouse system 400 does not require the account module 405 since the balances at any time can be calculated simply by going through the entire list of cleared transactions and adding/subtracting the amounts to/from the accounts as specified. With one account module 305/405, the list of cleared transactions and the account module is always consistent in what it reports to the outside world (e.g., the "cleared" action is atomic). The preferred embodiment includes both account modules 305 and 405 for convenience and timing. Having two account modules 305, 405 ensures the clearinghouse system 400 is consistent with the "cleared" list of transactions because the account module 405 updates the balances before the transaction is posted on the "cleared" list, whereas the account module 305 of the registry system 300 updates the balances at some point after the transactions have appeared on the "cleared" list. One advantage of having the account module 405 in the clearinghouse system 400 is that for transactions involving unregistered users or participants, the account module 405 of the clearinghouse system 405 reflects the updates, while the account module 305 of the registry system would not maintain balances for the unregistered.

Pricing Module 101

The pricing module 101A, 101B is used to determine the fair price for a work. Because different pricing mechanisms provide different incentives and balances between the needs of producers and users, communities of exchange will differ based on the rules and contracts regarding pricing. The simplest example would just be a fixed price for a work set at the time of registration. More complicated models dynamically adjust the price depending on the number of and nature of transactions.

The pricing module 101A, 101B can have a variety of models. In a first model, the pricing module 101A, 101B calculates one value for all types of exchange of a work. The work's registrant selects an initial price, expressed as a certain amount of units in a specified denomination of currency. The registrant sends this information along with an identifier of the work being registered to the pricing module 101A, 101B. In a second model, the pricing module 101A, 101B may calculate different values for different types of exchange of a work. The work's registrant selects multiple initial prices, expressed as amounts of units in specified denominations of currency. The registrant sends this information along with an identifier of the work being registered to the pricing module 101A, 101B. In a third model, the registrant also selects a pricing mechanism for calculating prices of the work at different stages in its transactional path. The pricing module 101A, 101B fixes any price or prices of the work at the initial value assigned by the registrant of the work. The pricing module 101A, 101B can thereafter subtract a fixed amount from any price or prices of the work each time the work is transacted. For example, the fixed amount could be one unit of currency, and the prices thereafter are expressed by the following equations:

$P_1 = Den_1, Amt_1$ $P_2 = Den_1, [Amt_1 - 1]$ $P_n = Den_1, [Amt_1 - (n-1)]$

In a modified version of the third model, to determine the price of a work, the pricing module 101A, 101B queries the seller's transaction log module 104 with the hash of the work. The transaction log module 104 returns the most recent transaction record. The pricing module 101A, 101B uses the price from this transaction record to compute the new price, $P_{new} = [P_{last} - x]$.

In fourth model, the pricing module 101A, 101B calculates any price or prices of the work from a specific chain of transactions (e.g., D is buying from C who bought from B who bought from A). In this case, the pricing module 101A, 101B may retrieve and calculate the number of transactions ("N") in the chain from the owner to the current purchaser. The price is calculated as a function of the initial price and N. For example, the price could be calculated as the initial price divided by N, $P_N = Den_1, [Amt_1 \div N]$. The pricing module 101A, 101B queries the transaction log module 404 of the clearinghouse system 400 with the hash of the work. The transaction log module 404 of the clearinghouse system 400 returns all cleared transaction records involving that good. The pricing module 101A, 101B uses the price of the most recent transaction and the number of entries to compute the new price such as according to the equation: $P_{new} = [P_{last} \div N]$. The division of the last price by the number of transactions ensures that each additional purchaser contributes additional revenue while also making it so that the community as a whole benefits by making sure that everyone eventually gets access at a price affordable to them. For example, suppose Bob purchases distribution rights from Alice and combines Alice's work with another work prior to redistribution. A community may mandate that Bob distribute Alice's portion of the combined work under the same terms by which Alice provided the work to him.

In a fifth model, the pricing module 101A, 101B calculates two different prices for two different types of exchange of a work. One price applies to a transaction in which the buyer acquires the right to modify and redistribute the work, and the other price applies to a transaction in which the buyer merely wants to redistribute the unmodified work (possibly in conjunction with his own work). This model can be operated by the pricing module 101A, 101B such that for every purchaser of distribution rights, some amount of value propagates back up the distribution chain to the work's earlier distributors and to its original creator. For every transaction the value propagating back up the distribution chain is fixed at a specific value or as a formula for computing a value. The value propagating back up the distribution chain may be determined by the participants in each transaction. In other embodiments, certain rules governing the redistribution of a work may be determined by the community.

In the preferred embodiment, a purchaser of modification rights establishes a new work, G', and initiates a new distribution chain. None of the value of transactions along distribution chains rooted at G' propagates back to the distribution chain of G. The distribution rights and modification rights may be measured in different currencies. For example, distribution rights may be measured in units of any user's time, while modification rights may only be measured in units of the original user's time. The seller of a work may change the price or the pricing mechanism of a work. To change the specific price, the seller sends a new amount and/or a new denomination to the pricing module 101A, 101B, along with an identifier of the work. To change the pricing mechanism, the seller sends an identifier of the work to the pricing module 101A, 101B and selects a different mechanism from those offered by the pricing module 101A, 101B. The actual price and the pricing mechanism may also be fixed so they may not be changed once they have been established.

In other embodiments, the community may establish rules governing user's abilities to change the price or pricing mechanism of a work. The pricing module 101A, 101B may select a pricing mechanism automatically, in accordance with rules established by the community engaging in the exchange. The pricing module 101A, 101B may select one of the pricing mechanisms listed above or some other pricing mechanism of the group's choosing.

The pricing module 101A, 101B preferably stores the current price, along with the hash of the work, in a database, similar to that shown in Table 11.

TABLE 11

| Identifier | Den | Amount |
|---|---|---|
| H(G) | $ | 1.00 |

The pricing module 101A, 101B may alternatively store the pricing mechanism, for example as the pathway to an executable file, as shown in Table 12.

TABLE 12

| Identifier | Den | Amount | Mechanism |
|---|---|---|---|
| H(G) | $ | 100.00 | /dir/path/file.exe |

The pricing module 101A, 101B can also store the type of rights corresponding to the various prices as shown in Table 13.

TABLE 13

| Identifier | Den | Amount | Rights |
|---|---|---|---|
| H(G) | $_1$ | 100.00 | Modification |
| H(G) | $_2$ | 1.00 | Distribution |

In the preferred embodiment, any user or module may query the pricing module 101A, 101B with a key. If the key matches one or more entries, the price or prices of the entry or entries are returned to the requester. In one embodiment of the module, there is one central pricing module for the entire community. Alternatively, each individual has his or her own pricing module 101A, 101B, but all of the pricing modules 101A, 101B operate identically. In both of these embodiments, all individuals in the system 50 may only choose from the same set of agreed-upon embodiments of the pricing modules 101A, 101B. In yet another alternative, each individual has his or her own pricing module 101A, 101B. Each community member may employ any of the aforementioned embodiments.

Methods

Figure 4:
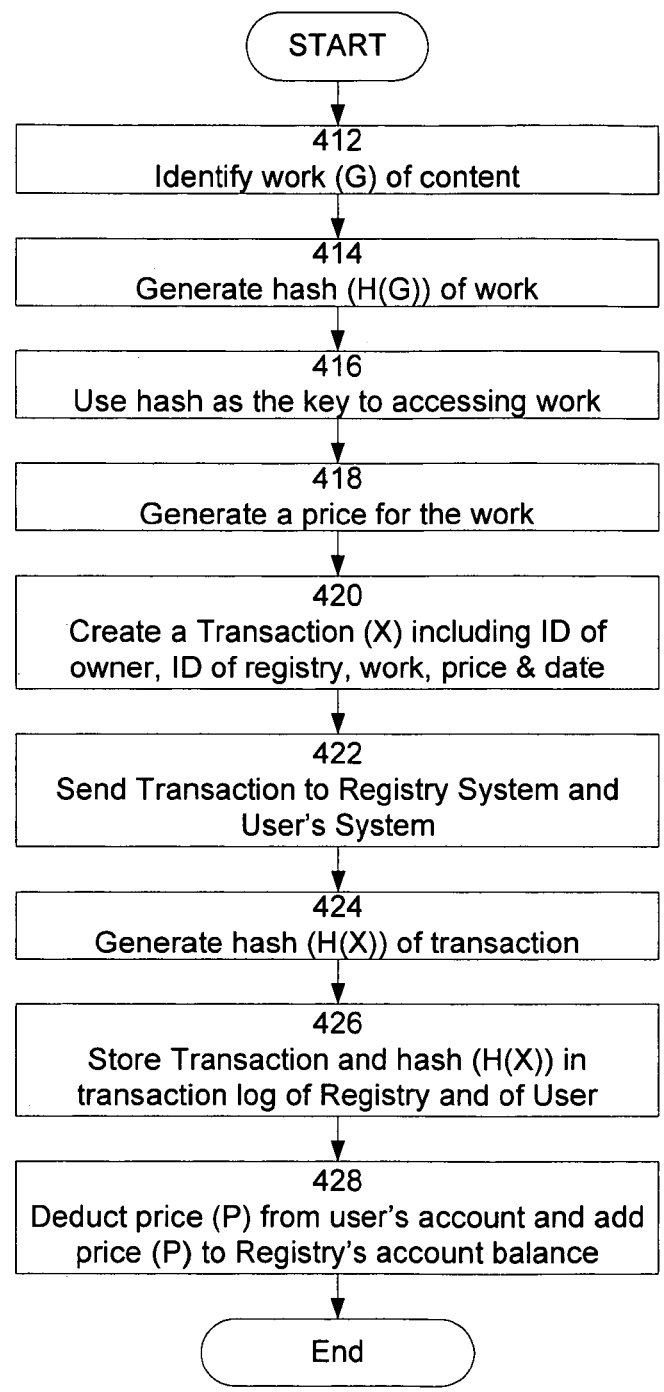
FIG. 4 is a flowchart of one embodiment of a method for performing registration according to the present invention.

Referring now to FIG. 4, the process for registering works with the exchange system 50 of the present invention will be described. Registration takes place when a user, A, wishes to make a new work (G) available within the exchange system 50. The method begins by identifying 412 a work of content and storing the work at a content module 102. Next, the process generates 414 a hash of the work. This is done by the content module 102 providing the work (G) to the hash module 900. The hash module 900 returns a hash value, H(G), back to the content module 102. Next the hash value, H(G) is provided 416 to the user as a key for accessing the work (G). Next, a price, P, of the work is generated 418 using the pricing module 101. Then the method creates 420 a transaction, X, including a number of parameters. The transaction is preferably generated by providing the key to the transaction generator module 103 and includes: 1) an identifier for credit account which is set as H(R), an identifier unique to the registry system 300, 2) an identifier for debit account which is set as H(A), an identifier unique to the user, 3) an identifier for a work set as H(G), 4) a price set as P, and 5) a date. The transaction generator module 103 sends 422 this information about the transaction to the transaction log module 304 of the registry system 300 and also to the transaction log module 104 of the user's system 100A for storage. Then the transaction log module 304 of the registry system 300 sends the transaction to the hash module 900 to generate 424 an identifier for the transaction, H(X). The identifier for the transaction, H(X) and the transaction, X, are then stored 426 in the transaction log 318 of the registry system 300. Similarly, the transaction log module 104A of the user system 100A sends the transaction to the hash module 900 to generate 424 an identifier for the transaction, H(X). The identifier for the transaction, H(X) and the transaction, X, are then stored 426 in the transaction log 318 of the user system 100A. Finally, to complete the registration process, the account module 305 of the registry system 300 subtracts the price from A's account balance and adds the prices to the Registry's account balance 428.

Figure 5:
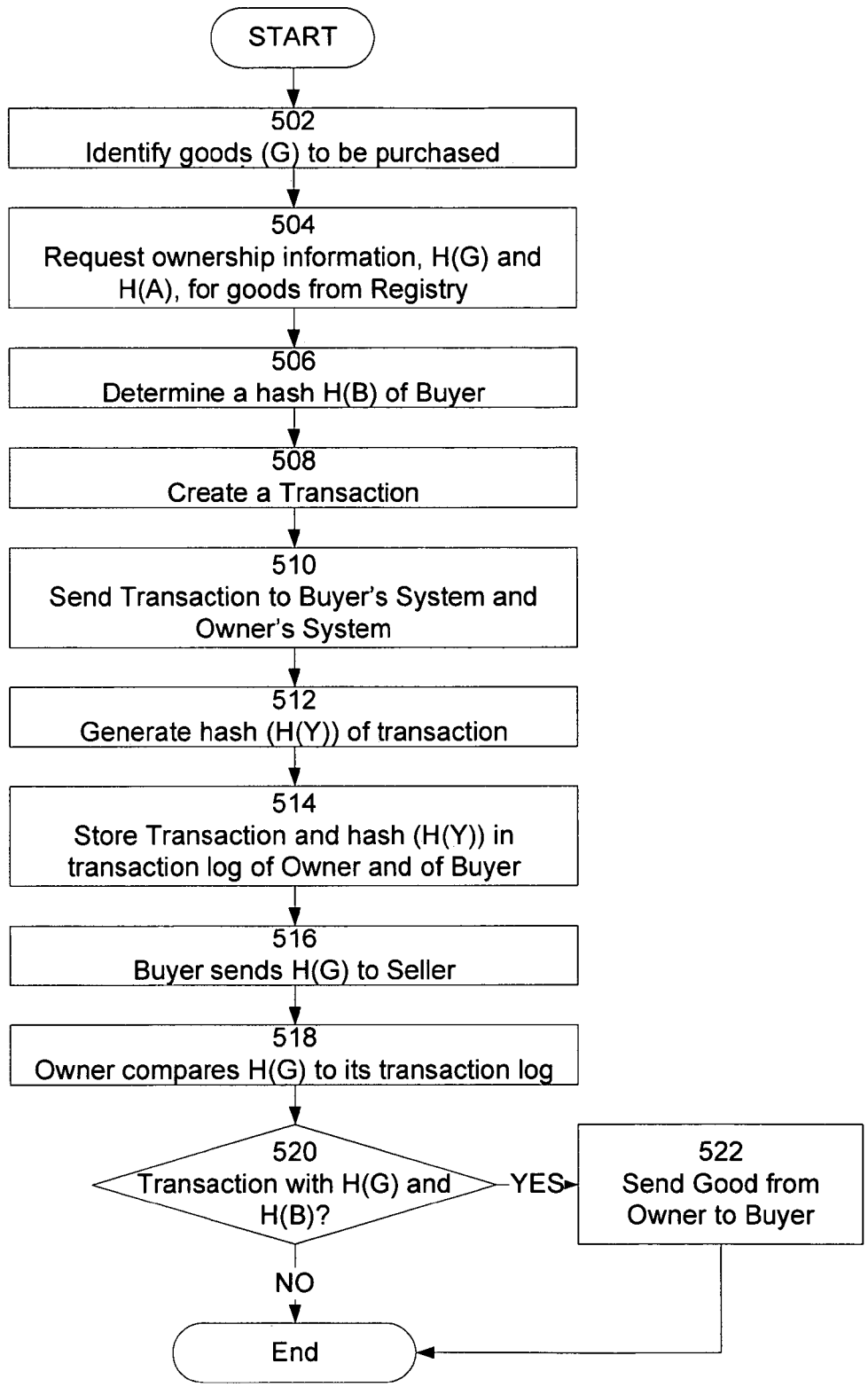
FIG. 5 is a flowchart of one embodiment of a method for performing an exchange between a seller/owner system and a buyer system according to the present invention.

Referring now to FIG. 5, the method for performing an exchange according to the present invention will be described. An exchange takes place when a buyer, B, agrees to pay a seller, A, a price, $P_A$, determined by the pricing module 101 in exchange for the right to distribute or modify a digital work, G. The buyer may hear of the availability through any of a number of channels, such as an email or a post on a website. The method begins by identifying 502 the goods or works to be purchased. Using the user interface module 314 as has been described above, the user can obtain an identifier associated with the goods, H(G). Once the goods have been identified, the user uses the identifier associated with the goods, H(G), to generate a transaction. This process starts by providing the identifier associated with the goods to the transaction generator module 103B. The transaction generator module 103B sends 504 a request to the transaction log module 304 of the registry system 300 to obtain ownership information for H(G) and an address of the owner's transaction log module 104A and pricing module 101A. Alternate parameters may also be included in the request to transaction generator module 103B. Then the method determines 506 a hash, H(B) of the buyer so that it can be included in the transaction. This is done by sending the email address for the buyer to the hash module 900. The transaction generator module 103B also sends a request including the identifier associated with the goods, H(G), to the pricing module 101 to determine the price of the goods. Next the transaction, Y, is created 508. This is preferably done by transaction generator module 103B by creating a record with the following information: 1) a credit account=H(A), 2) a debit account=H(B), 3) a work=H(G), 4) a price=$P_A$, and 5) a date. Then the transaction generator module 103B sends 510 the transaction to the transaction log module 104B of the buyer and the transaction log module 104A of the seller. In one embodiment, the transaction generator module 103B can require the user A to confirm the transaction before it is sent 510. Next, an identifier for the transaction, H(Y), is generated 512 by the transaction log module 104A submitting the transaction to the hash module 900. The transaction log module 104A stores 514 the identifier and the transaction in the transaction log 318 of system 100A. Similarly, the identifier for the transaction, H(Y), is generated 512 by the transaction log module 104B submitting the transaction to the hash module 900 and the transaction log module 104B stores 514 the identifier and the transaction in the transaction log 318 of system 100B. Then the buyer sends 516 an identifier H(G) as a request to the content module 102 for the goods. The owner or seller compares 518 the identifier H(G) to its transaction log 318 to ensure the existence of transaction Y with the characteristics of 1) a credit account=H(A), 2) a debit account=H(B), 3) a work=H(G), 4) a price=$P_A$, and 5) a date. The method determines 520 if there is a transaction with identifiers H(G) and H(B). If so, the method sends 522 the goods from the seller to the buyer. If not the method is complete and ends.

Figure 6:
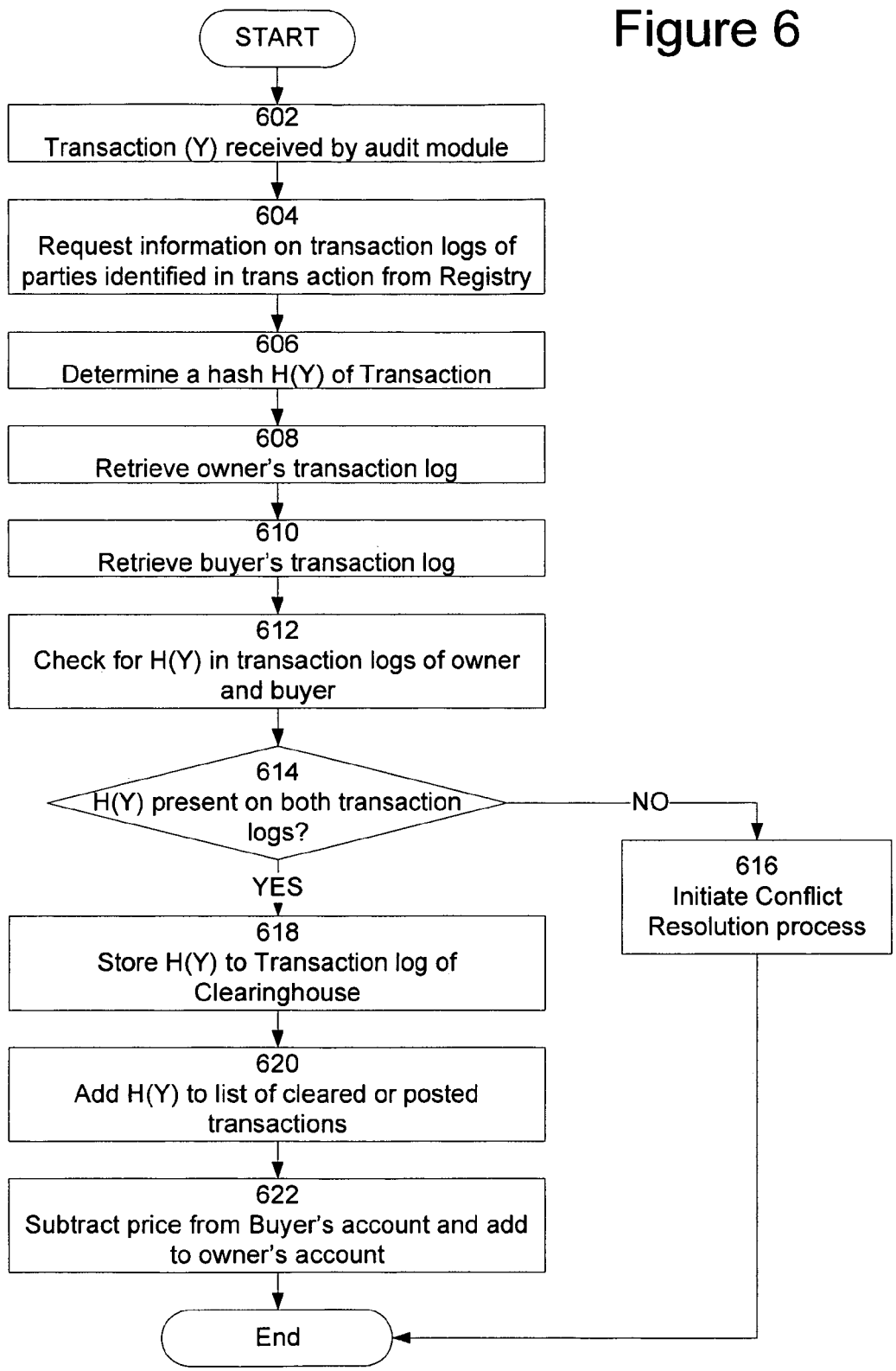
FIG. 6 is a flowchart for one embodiment of a method for auditing transactions according to the present invention.

Referring now to FIG. 6, the method for auditing transactions in the exchange system 50 and according to the present invention will be described. Auditing takes place after a seller, A, and a buyer, B, have completed a transaction, Y, for a digital work, G, at an agreed-upon price, $P_A$. The method begins when the transaction, Y, is received 602 by the audit module 406 from a transaction generator module. 103A, 103B or from some other module. The audit module 406 accesses 604 the account module 305 of the registry system 300 to obtain the locations of A's and B's transaction logs 318. Then the audit module 406 determines 606 a hash value of the transaction using the hash module 900. The audit module 406 cooperates with the transaction log module 104A to retrieve 608 A's transaction log. The audit module 406 also cooperates with the transaction log module 104B to retrieve 610 B's transaction log. Then the audit module 406 checks 612 for the hash value of the transaction in the logs 318 of the seller and the buyer. The method next determines 614 whether the hash value of the transaction is in both the transaction logs. If not, the audit module 406 initiates 616 a conflict resolution process. If the hash value of the transaction is in both the transaction logs, the method continues in step 618 where the audit module 406 sends the hash value the to transaction log module 404 to store the hash value in the transaction log of the clearinghouse system 400. The transaction log module 404 also adds 620 the hash value a list of cleared or posted transactions or a list of cleared transactions maintained by the clearinghouse system 400. Alternatively, the transaction log module 404 adds the hash value to a Posted list, the audit module 406 sends confirmation to the transaction log module 404, and the transaction log module 404 puts H(Y) on a Cleared list and removes it from the Posted list. The audit module 406 sends the transaction to the account module 405 that subtracts 622 the price from B's account balance and adds the price to A's account balance.

Applications of the Exchange System 50

The exchange system 50 described herein provides powerful new tools for cooperation and coordination amongst members of an association or the social organization. The following sections illustrate particular aspects, applications and uses for the exchange system 50 within various contexts.

1. Registration with a Central Authority

In the simplest case, the exchange system 50 is set up with a single entity, such as a nonprofit corporation, acting as the registration authority. This entity may define and enforce various rules associated with the exchange system 50, particularly with respect to the registration of members. The authority might, for example, require members to pay a fee in order to provide those members with an account number, listings of their transaction log, and any other information deemed by the authority to be "public" within the exchange. Such information might include account balances, a public encryption key, or the person's name.

The exchange authority would determine the process for modifying listings and handling conflicts. One method of handling change requests (including registration requests) would be to allow users to send these requests via a web browser 314 to the registry authority server 300. In particular, the registration request would include an official e-mail address for a designated agent of the account. Upon any change requests, the registration server 300 would generate a confirmation message and send it to the designated agent. Upon receipt of a response to the confirmation message by the designated agent, the server 300 would accept the request. Note that the server 300 may also require the designated agent to prove that they know some additional secret shared between the registration authority and designated agent or accept only requests signed with the registered private key of the agent.

Membership dues in exchange for registration. In addition to a registration fee, the registration authority might charge ongoing fees, such as a yearly subscription fee, to continue listing a member's information. By revoking the listing privileges of members not in good standing, the registration authority might not actually prevent them from participating in exchanges. However, parties who engage with those members would have to rely only on the member in question for the transaction history information normally verified by the registry system 300 and clearinghouse system 400 (e.g. ownership rights and account balances).

2. Registration with Distributed Authority

Instead of relying on a central authority, members of the exchange system 50 may themselves decide on and enforce rules regarding membership, allowable transactions, and other exchange parameters. In effect, all members would agree to a mutual contract upon joining and using the services. To distribute the workload, the tasks of validating memberships, handling conflicts, and other administrative matters might be distributed amongst members. In such an embodiment the registry system 300 and clearinghouse system 400 functionality would be divided and assigned to different user systems 100A, 100B.

Charges for sponsoring new members. Existing members of an exchange system 50 might "pay" into a common registry when inviting prospective members to join. Group members could agree on a minimum amount needed to open a new account. When an existing member wishes to sponsor a new member, this amount would be deducted from the sponsor member's funds and transferred into the new account via the registry. During the registration process, the sponsor would specify the designated agent and other information for the account.

Whenever a change is requested for the new account, the sponsor would be notified before the change is accepted. For example, if the new user wants to register a different URL for his transaction log 318, the sponsor would be notified and would have to accept that request (e.g. by posting the associated transaction on her own transaction log) before it is allowed.

Independent auditing. Similarly, the clearinghouse functions can be shared amongst the group members. Assuming that all transaction logs are accessible to all members, any individual member can audit any logs he chooses. Auditing can be performed on a transaction-by-transaction basis, for a set of transactions involving a particular work, or for a set of transactions associated with a particular account. Members can calculate the balances associated with accounts and publish this information to other group members. In this way, members are not dependent on any single individual or entity in deciding whether to trust the information provided by another party; they can check with as many or as few other members as they deem necessary in order to gain confidence in their dealings with that party.

Distribution of association earnings according to account balances. Association members as a group may decide to impose membership dues or other fees for services provided by the Association. In addition to covering the operating expenses of the Association, some portion of the proceeds may be designated to be returned to Association members. The percentage going to each member may be dependent on their account balances. As an example implementation, the balance for an individual divided by the total number of units in circulation can be used to determine the percentage of proceeds going to the individual.

In order to promote fairness within the Association, specific rules regarding the issuance of currency could be enforced. For example, the Association might determine that members may not carry negative account balances. Transactions which would result in a negative balance for an individual would not be posted to the cleared list by the clearinghouse.

The Association might also require that members earn their currency by providing a set number of hours of service to the Association each month. For example, a library Association might require each patron to spend 8 hours a year performing some service to the library, such as restacking books. The Association would "pay" members for this service with grants of currency, say 100 units, which they could use to participate in exchange systems. (Note that in any given year, members with an account balance of over 100 units could use those units to "buy" out their service requirements, either directly, by redeeming the units with the Association, or indirectly, by "paying" another member to perform their service obligation.)

Rulemaking regarding pricing and other association-wide contracts. One of the key contract terms for any exchange system 50 regards the notions of pricing and property rights that determine the allowable transactions. For example, the exchange might enforce a "first sale" right governing the redistribution of a work. In one implementation, if Alice posts a cleared transaction indicating a sale of distribution rights of a work, G, to Bob, then Bob has the right to make subsequent offers of G to any other member of the exchange under the rules of the exchange. In other words, Alice cannot place conditions on Bob which would prevent him from making G available to others.

Such exchange rules might also limit Bob's subsequent transactions. For example, he might have to charge some minimum amount for G, with some portion of that amount being returned to Alice. This amount may be determined by the price that Bob pays to Alice. As an example, if Bob pays Alice 10 units for G, the pricing rules for the exchange might determine that Bob cannot sell distribution rights to G to others for less than 2 units, with at least 1 unit being forwarded to Alice. In this context, "distribution" can be defined as Bob's content module 102 responding to requests for H(G) by returning G to the requestor. This and any additional "royalty" payments could be implemented as a separate transaction between Bob and Alice that consolidates the sequence of Bob's royalty payments into a single transaction related to work G. Changes to rules such as these could be subject to a rulemaking process defined in the constitution of the Association.

3. Multiple Identities for Individual Users

Thwarting identity theft. In many situations, it may be desirable for a user to have multiple accounts which all map to the same "identity." For example, Alice may wish to build a reputation for a collection of works by registering them under one widely known account number. However, she may wish to use a separate account number in purchasing items from others. Among other things, this would allow her transaction log module 104 to easily discard or reject any fraudulent transactions attempting to use the first account number as a debit account.

To do this, Alice can register a second account number and have the registry system 300 point it at the same transaction log URL as the first account number. When purchasing from another party, Alice would reveal the second account number to that party, but both parties might agree to keep the details of the transaction private.

Technically there is no limit on the number of accounts which could be registered to point at the same transaction log. In practice, the registry authority may impose fees for having multiple account numbers to cover the increased costs of auditing.

Note that the account module 305/405 might consolidate all accounts using the same transaction log into a single account (e.g. the originally registered ID) for the purpose of tracking and reporting balances. Another way to account for this consolidation would be to establish automatic generation of currency-swap transactions between account identifiers that map to the same transaction log.

Automatic acceptance or rejection of transactions. Maintaining multiple accounts for individual members works well in conjunction with transaction log modules 104 that make use of rules regarding which transactions to accept and reject. For example, Alice might use a web browser or other interface 314 to configure a set of processing rules on her transaction log module 104. (Access to view or modify these rules would be protected through mechanisms like passwords, e-mail confirmations, or other standard techniques.) One such rule might direct the transaction log modules 104 to accept any transaction which lists Alice's "public" account as the credit account. Another rule might reject any transaction which lists her public account as the debit account.

4. Private Transactions

As cited above, the members involved in a transaction may wish to hide some details of their transaction. They would still post to their respective transaction logs the transaction identifier, the amount and the domination of the currency transferred, and whether it was a debit or credit to the account associated with each transaction log. However, they could decide that other details would not be made public, but would be stored in a private area on each individual's transaction log 318. Depending on the exchange rules, the clearinghouse system 400 might simply match the transaction identifiers and ensure that the amounts are correct and balance (i.e., for every credit there is a corresponding debit).

To protect against false claims, the clearinghouse system 400 might require that the transaction logs supply additional details of the transactions or prove that they are in possession of such details and can provide them on demand to the clearinghouse system 400. One way to do this is for the clearinghouse system 400 to send a "challenge" to both transaction logs 318. The logs 318 calculate the hash of the transaction details concatenated with the challenge string. If the response from the transaction log 318 claiming a credit matches that of the log claiming a debit, then the clearinghouse system 400 can be confident that the two parties share the same transaction information. This also confirms that neither party is falsely claiming to be a party to the transaction.

Note that unlike account balances, which can be validated without revealing the details of the exchange, ownership rights can only be validated if the identities of the buyer, seller, and work being transacted are all known. As a result, if one of the parties to a private transaction wishes to prove ownership rights to a third party, the party involved in the transaction must reveal the transaction details. The policy concerning if and when this type of revelation is appropriate may be determined by the individuals in an exchange or by the community at large.

Blinded transaction histories. For additional privacy, the credit and debit transaction logs 318 may refer to the same transaction by different identifiers. One mechanism for doing so uses a third, "intermediary," account. Both parties engage in independent, offsetting transactions with this third account. Note that depending on the level of trust in the intermediary, the two parties may exchange information privately, denoting the details of these intermediary transactions. Each side may wait for both transactions to appear on the intermediary's transaction log before posting the transactions to their own logs, thereby allowing the transactions to first be cleared by the clearinghouse system 400.

5. Creative Groups in Context of Larger Exchange

Group accounts. In many situations, groups of people collaborate in the creation of a work. These groups may differ in how they allocate credit amongst group members. For example, five people may collaborate on writing a document. In this case, the five individuals may together create and administer a group account. Depending on the rules of the exchange system 50, the individual accounts may or may not be listed as part of the group account's registered information.

In most circumstances, any member can act on behalf of the group, though the group itself may decide on certain rules, such as whether to require consensus before any "debit" transactions are allowed to post on the group's transaction log. As an example, consensus may only be required for debit transactions over a certain amount.

Differential pricing/"in-group" pricing model. Individuals may offer group members special pricing on individual works created and registered under their own accounts. In particular, they may make those works free for modification within the group with the understanding that any derivative works would be registered under the group's account and any earnings would be distributed according to group agreement.

Individuals might also offer different prices to group members for works they did not register. For example, they may purchase distribution rights to a work and redistribute the work with a lower price to individuals inside the group than to individuals outside the group.

Ability of members to "trade" on group accounts. A group may allow individual members to "borrow" against the group account. For example, an individual member may want to register a work and make it available to exchange members outside of the group with an initial price of 100 units. However, the exchange rules may require the user to pay those 100 units up-front to the registry system 300. A user with only 10 units available could enter into a transaction with the group whereby the user's account is credited 90 units and the group's account is debited 90 units. This allows the individual to register the work (and presumably pay back the loan from the future earnings).

Group-specific exchange rates. In cases where an exchange has multiple different denominations of currency, exchange rates may be used to set the prices for currency transfers between accounts. Normally these exchange rates would be determined by market mechanisms. Members are free to engage in exchanges of currency at whatever rate they negotiate. Assuming information on these transactions is publicly available via the transaction logs, these transaction records can be used to calculate the (moving) average for the exchange between any two currencies.

These exchange rates could be used to calculate a single "total" value for a given set of transactions, such as those relating to a particular work, denominated in a chosen currency. To calculate the value of its member's interactions or set internal prices for currency exchanges, a group may calculate exchange rates by considering only those transactions which involve members of the group (i.e. have a member account listed as either the debit or credit account).

In Exchanges where there is a denomination associated with each member account, the "group exchange rate" might expand to take account of any exchange denominated in units associated with the accounts of a member.

6. Collaborative Discussions (e.g. Bulletin Boards, Blogs)

In traditional markets, prices provide an excellent measure of the overall value of a good to the market as a whole. In particular, prices for different objects reflect the aggregated actions of market participants and the approximate value of those objects relative to each other. Within the contexts of the system described herein, the aggregate value of a work, G, is reflected by the total value of exchanges involving G rather than the current price for G. (This difference is due to the infinitely replicable nature of digital goods.)

In other words, in the preferred embodiment of the system 50, the more valuable a work is to the market as a whole, the less that any individual pays for that work. Nevertheless, because the total amount earned for a work increases with each additional buyer, the system 50 still provides very strong incentives to authors and distributors of the work. (In one sense, the fact that works in this system 50 decline in price as they become more popular acknowledges that much of the value for any work is created by the group as a whole rather than the efforts of a single individual.)

Display Order. The cumulative value of transactions involving a work can serve as a very effective basis for presenting information to users in order of relative importance. In particular, a set of items accessible to a user may be displayed in descending order of their total value. For example, within an online discussion board, Alice's work G may appear lower on a list of works than Bob's work W. If Carol posts a comment on G, she might also, as part of the posting process, purchase distribution rights to G from Alice. This purchase would increase G's overall value in the market relative to all the other works. This value can be calculated by simply summing the amounts of known transactions involving G. If the price paid by Carol is high enough, G would subsequently appear before W in the list of works.

Restriction to display only affiliated users/currencies. In addition to ordering works by their total value, other value calculations based on a subset of transactions can be used. For example, as above, the value might be based only on transactions involving members of groups to which the user belongs, or transactions involving individual accounts with which the user has had exchange transactions in the past. FIG. 9 provides a sketch of the user interface 902 displaying of a list of items ordered according to various different measures of value.

Use of custom exchange rates to calculate total value. Instead of using a value calculation to order works, items could be listed in an order determined by the current account balances of the registered authors. This would be particularly useful for new items or items of limited intended audiences such as e-mail messages. In this case, the account balances can be retrieved directly from the clearinghouse system 400 account module 405.

If the Association is using denominations associated with individual accounts, then the balance of accounts between the user and the author can be used for the ordering of items. (Note that the total value of exchanges that have taken place between two individuals might be a better ordering since a small net balance may be the result of many fruitful two-way exchanges.) Alternatively, the ratio of positive balances (e.g. favors owed to the author by others) to outstanding balances (e.g. favors owed by the author to others) can be a strong predictor of relative worth and could be used to order a list of items.

Choice of price. Given orderings determined by the total value of transactions associated with a work, authors have an incentive to assign a high initial price when registering a work. Likewise, distributors (in this example, people posting comments on a work) also have an incentive to pay more than the minimum price for redistribution in order to be listed higher relative to other comments. These incentives are offset by the limited units available to authors. In particular, purchasing registration rights for work G would leave Alice fewer units to register or redistribute other works.

7. Exchange of Hours/Service

As a backing for the units of exchange, the rules governing an exchange may specify that units be exchanged directly for hours of service. Members with outstanding balances would be obligated to make themselves available for some amount of time each time period. When presented with a request to redeem units, members would be required to provide services at a fixed rate.

Existing "Time Dollar" projects and other examples of alternative currencies also have this characteristic of directly accounting for hours of service. However, these systems suffer from various limitations. Most importantly, there is no mechanism for determining the relative value of different people's time—that is to say, the aggregated value as judged by the collective actions of all the individual members. Usually, Time Dollar systems fix the exchange rate as being identical for all participants, though participants can often engage in some negotiations with each other regarding the value/price of a service.

Multiple currencies (contrast with Time Dollars). The exchange system 50 described herein works best if each account is associated with a particular denomination of credit or unit of value. In this case, members are required only to provide service in exchange for units denominated "in their own time" (the denomination associated with their account). Users with no outstanding balances would, in effect, be free from such service obligations. While the minimum number of units per hour is fixed by the exchange rules, members are free to trade "currencies" amongst themselves with differential values of the currencies presumably reflecting variations in the demand for services provided by different individuals.

Relationship to Accounts Payable/Receivable. In many ways, the exchange system 50 presented here with the trading of these "individual" currencies can be seen as an "open clearinghouse," or a mechanism for maintaining and resolving balances of services at the individual and small-group level.

Scheduling. Within each time period, members with outstanding credit must make themselves available for scheduling so that holders of their credit can reserve time to redeem those credits. Such a scheduling system could be run by the central registry, or by individual users. Members are required to identify time slots during which they are available. They may also be required to list with the registry the types of services they provide.

For example, if Bob has 20 units of Alice's currency, and 10 units=1 hour, Bob could reserve a two-hour time slot to meet with Alice (email, voice, in person, etc). Bob does this by visiting an online scheduling service provided either by the exchange organization or directly by Alice. When Bob selects a timeslot, the system 50 generates a transaction with parameters of the time and service to be performed. Posting this transaction to Bob's transaction log serves to reserve the timeslot. Alice then makes herself available at that time and place to provide Bob with the desired service. After the service has been performed, Bob updates the transaction status to be "cleared," denoting that the service has been rendered. (Note that the registry system 300 may include a list of services that each member is capable of and willing to provide for other members as part of their community service.)

8. Demurrage Charges in Context of Community Service Organization

The current system 50 may be used by nonprofit or volunteer associations in order to better coordinate their resources. As above, members pledge a certain number of hours of service or other support to the organization during each time period. In exchange, they receive an allocation of credits into their account denominated in their own account units. Whenever a member uses some of these units in a transaction, the date and amount of that transaction is registered with the account module 305/405.

Expiration of credits. The organization may set rules such that the value of units decreases over time. For example, if 10 units are originally worth one hour of time, those 10 units might decrease in value by 1 unit each week they go unused. This prevents hoarding, eliminates the possibility of individuals accumulating unfulfillable obligations, and encourages investment of perishable resources. All individuals must "spend" their time at a constant, fixed rate. In that sense, the amount of service an individual can perform within a given a time period is a limited, "nonrenewable" resource. With a decrease of 10% of the original issuing amount per week users can be guaranteed that the obligations represented by their time units will be fulfilled within six weeks. This allows them to plan their time and promise to meet all obligations, including availability to redeem service requests, as specified by the organization and exchange rules.

Rather than simply releasing users from expired obligations, these expired credits go into a special "service" account associated with the organization. The organization draws upon this account and redeems the credits in return for services performed by the members, ensuring a steady stream of effort devoted to collective activities.

9. Exchange of Emails Among Individuals

The invention can be used by a community as an email platform to enable anonymous, spam-free communication while facilitating the exchange of services and digital works. As opposed to traditional systems, the present invention allows senders and receivers to communicate without relying on a single trusted party.

The registry system 300, which is preferably spread out over several different machines, maintains a list of registered hash identifiers corresponding to email addresses within a given community. To register an email address, a user sends a hash string of the address and a hash string corresponding to an already-registered "sponsor" to the registry 300. The registry 300 posts a transaction to the sponsor's transaction log indicating the hash of the address to be registered. Upon confirmation by the sponsor, presumably after confirming the validity of the new user, the sponsor clears the transaction, and the registry begins responding to requests for the new hash identifier.

Users have two choices in receiving email. First, they can reveal their email address to the registry itself. Second, they can poll their transaction log to retrieve email addressed to that identifier. In the first case, the registry may validate the user's email address using the confirmation key sent to that address and require a response including that confirmation key before registering the identifier. In the second case, the user or some intermediary could poll, a private transaction log which lists the email sent to that account (this log could be, for example, a weblog or RSS feed accessible only to that user). When sending an email, the user's email agent can use [hash_identifier]@[registry_machine.com] as a return address. When the registry machine or any other machine receives email for that identifier, the email is posted to a private transaction log accessible by that registered user.

To obtain registration information about a particular e-mail address, a requester computes the one-way hash of that e-mail address and sends it to the registry 300. The registry may require and record information about the requester, including their IP address and possibly their registration information, before giving out some or all of the response. This information may be forwarded to the person whose hash is being checked.

Assuming the requester meets all necessary criteria, the registry 300 issues a response. If the hash has been previously registered, the registry 300 responds with the associated registration information, which might include the date of registration, sponsor information, membership status, and other information. If the hash has not been registered, the registry notifies the requester as such.

Using this system, multiple parties can exchange emails without revealing any party's true email address. For example, Alice can post a message to Bob's log that will be sent to him as an email. When it arrives, her email address appears to Bob as an alphanumeric string such as 1950e1e61ee70909837e454fbe565c74 (the hexadecimal representation of the MD5 hash of alice@mail.server.com).

Before Bob sees the message, his client can query the registry to obtain membership status information for Alice's hash string. If it is not registered, his email client may choose to ignore the message or to subject it to special processing, such as flagging it as coming from an non-member source. (These parameters may be set by Bob himself or determined by the community.)

If it is registered, Bob's client may choose to allow the message to be sent to Bob's inbox, or may query the registry 300 for further information about the sender before deciding whether to accept it or not. For example, the client may retrieve membership information for Alice's sponsor and check to see if he is known to Bob. If not, the client can repeat this process going up the chain of sponsors until it comes to a sponsor field corresponding to a known e-mail address (or until it encounters a loop). Assuming that a known address is eventually found, the client can make a determination about whether or not to read the message, given the identity of the known sponsor and number of intervening steps between the known sponsor and the unknown address. Once again, these parameters may be set by Bob himself or may be determined by the community.

Assuming that Alice has met all necessary criteria and her email has been transferred successfully, Bob may decide to send her a response. In order to do this, Bob can obtain the location of Alice's log 318 by querying the registry 300 with her hash string. When Bob posts his response on her log 318, his message is sent to Alice's email client, with his email address likewise appearing only in its hashed representation. Bob and Alice can thus have an email exchange without ever revealing their true email addresses.

This anonymity can be vacated at the discretion of the users, since knowledge of the original digital object allows for the computation of the corresponding hash string. For example, if Bob knows Alice's true email address, his client can automatically compute its hash and check it against the hashes of incoming messages. When Alice sends him an email, the two hashes will match and the true email address (alice@mail.server.com) can be displayed.

Note that in this system description, spam and other unwanted email can be effectively blocked from community email exchanges, as every email address must be registered, with registration dependent on sponsorship by an existing community member. There is, as a result, always a certain amount of accountability that can be used to penalize or expel those members who do not act in the best interests of the community.

This exchange system 50 may also be employed to facilitate the exchange of services and digital works. Suppose Alice is an accountant and Bob is a web designer. Alice might send Bob an email offering 10 hours of her time in exchange for Bob designing her website.

If Bob decides to accept the transaction, he sends an email both to Alice and to the registry 300 noting some amount of currency less than or equal to Alice's original offer. Once Alice acknowledges Bob's email, the transaction is publicly registered with the email itself serving as the "work" being transacted. As described above, the transaction record is posted publicly and each party's account balance is updated in due course.

Later, Bob may be in need of Alice's help to complete his tax return. Bob sends Alice an email offering to pay her 5 hours of her own time in exchange for 5 hours of her services. In this case, since Alice has previously paid Bob 10 hours of her time, she is obligated to respond to Bob's offer. The two parties will preferably work out an exchange which makes the best use of both Bob's and Alice's time. In one use of the invention designed to facilitate this, all community members will maintain public calendars that list the times they are available for repaying time debts to other community members. For example, Alice may list every Monday evening from 6:00-11:00 p.m. as available time for repayment; Bob could then freely schedule Alice's service to him during that time. As described above, Bob registers the transaction by sending an email acknowledgement to Alice and to the registry 300, after which the record is made public and account balances are updated.

Alternatively, Bob may initiate the original transaction by sending an email to the registry and to one or more members of the community in which he makes his web design services available under certain stipulations. He may, for example, offer his services only in exchange for units of his own time, or he may agree to accept units of anyone's time. Note that in the former case, Bob retains more ownership over the work, since it is only available to people to whom Bob already owes his time. In the latter case, Bob is agreeing to work on a for-hire basis for anyone who decides to pay him the specified amount of time.

Bob may also choose to limit his availability, for example to a certain number of hours per week or to certain days of the week.

To take one example, suppose that Bob has offered his web design services to the community. Those services are available for exchange only with units of his own time, and are limited to 10 hours per week. Alice may choose to accept Bob's standing offer by sending an acknowledgement email to Bob and to the registry with such terms as she specifies (as long as they are within Bob's predetermined parameters). Bob, having already made the initial offer, would be obligated to perform the work.

Note that in this email-based system, it is generally the seller who makes the initial transaction post (the "offer") and the buyer who accepts it. This is the reverse of content-based exchanges, in which it is generally the buyer who makes the initial offer and the seller who accepts it.

In some cases, it may be desirable to verify the authenticity of the original email without necessarily incurring a currency exchange. To do this, the sender of the email may choose to register the email message containing the proposal with a price of zero. By. doing this, the sender allows the recipient to check the registry's record of the email and determine whether or not the received content matches the sent content.

Using the first example above, Alice could also send to the registry 300 her original email proposing that Bob trade his services for 10 hours of her time. When Bob receives Alice's email, he can compute its hash and send that hash to the registry 300. If a record of that hash exists in the registry 300, Bob can be confident that the content he received was identical to the content Alice intended to send. In accepting the email, Bob agrees to the zero-price transaction, which publicly establishes that Bob accepted Alice's email as authentic. Neither Bob's nor Alice's balance is affected.

An additional benefit to this system 50 is that transactions may be linked via a threading system common to standard email communication. This allows any user to trace the history of a work or service being offered for exchange, enabling trusted transaction chains in a community.

For example, suppose Alice is willing to offer 10 hours of her time to Bob in exchange for Bob's web design services. Bob, having already done his taxes, decides he doesn't need Alice's accounting skills himself. However, Bob does need help building a database-driven website for another client, and he knows that database expert Carol would be happy to use Alice's accounting services.

Bob agrees to perform the web design for Alice in exchange for 10 hours of her time. Subsequently, Bob sends an email to Carol offering 10 hours of Alice's time in exchange for Carol's help with his database project. Included in Bob's email is a link to the publicly posted record of the transaction between him and Alice. Carol can follow this link to verify that Bob has obtained Alice's time appropriately. Carol can also check with the clearinghouse account module 405 to ensure that Bob has a sufficient balance in Alice's currency to complete the transaction after taking into account all transactions posted on Bob's log. Additionally, Carol might check with Alice's transaction log 104 and/or the clearinghouse system 400 to ensure that the obligations are still valid and redeemable.

Threading may also be useful for ordering emails based on the value assigned to them by the various parties to the email exchange. For example, Alice may offer to pay Bob a small fee to read and respond to an email. When Bob responds, he may include Carol on the recipient list and offer her a fee in exchange for her comments. Carol agrees, and in her response offers both Alice and Bob fees for their comments on her email. The summed value of all of the accepted transactions is used by the user mail agent, or the user interface module, or some other system component to calculate the total value of the email thread.

When an individual views his or her inbox, this value measurement could be used to rank the order in which messages appear. The specific ranking mechanism could be determined by the individual or by the community. Possibilities for ordering threads include: total thread value, outstanding value offered to the viewer, or outstanding value offered by the viewer. Regardless of the specific ranking mechanism, this system serves to accurately portray the relative values of email threads to the viewer.

10. Book Club

The invention can also be used for a commentary-based community such as a book club, with the underlying accounting mechanism serving to order member contributions. In this context, comments are treated as digital works, subject to the exchange mechanisms described above, and are ranked in some order reflective of their value.

In order to post comments, community members must pay a certain amount of currency. The price of an originating comment in a thread (for example, an initial book review) is purchased directly from the registry; this can be thought of as buying space on a page. The price of any other comment (for example, a community member's response to the first review, or another member's comment on that response) is paid to the user who posted the comment to which the present comment is directed; this can be thought of as purchasing distribution rights for the parent comment from its author.

Payments for child comments accumulate to add value to the parent comment with which they are associated. Same-generation comments are then ranked in some order reflective of their value, either to the individual viewing them or to the community as a whole.

In one example, Alice pays 10 hours of her time to the registry 300 in order to start a new page with the first review of a book. Preferably, the price, $P_m$ to modify Alice's review will also be 10 hours of her time; meanwhile, the price to distribute her review (that is to say, to comment on it) is determined by some agreed-upon formula maintained by the community's pricing module. As an example, the price, $P_d$, to distribute Alice's work could be $\$_{anyone} P_i/10$, where $P_i$ is initial price Alice paid and $\$_{anyone}$ indicates that the price may be paid in anyone's currency.

Using this example, if Bob wishes to make a comment that will show up within the context of Alice's review, he can do so by paying the distribution price of $\$_{Bob}1$ to Alice. If he wishes to modify her review, he can pay her $\$_{Alice}10$ and start a new review page. In the latter instance, Alice's review page may link to Bob's review page, but no further value generated on either page will be transferred to the other.

Assuming that Bob purchases distribution rights and leaves his comment on Alice's page, Carol may wish to comment on or change Bob's comment. Using the same pricing system, the price for Carol to modify Bob's comment is $\$_{Bob}1$ and the price to add a comment to it is $\$_{Anyone}0.1$. However, in order for Carol's comment to show up both within the context of Bob's comment and within the context of Alice's original review, she must also purchase distribution rights to Alice's work. As a result, Carol will likely actually pay $\$_{Anyone}1.1$ to comment on Bob's comment, or $[\$_{Bob}1+\$_{Anyone}1]$ to modify his comment.

A comment's rank in a given context is determined by the total value associated with that comment relative to the other comments in the same context. For example, if we assume that all currencies are valued equally, Bob's comment on Alice's review is worth $2.1 ($\$_{Bob}1+\$_{Carol}1.1$). Meanwhile, Dave's comment, which he paid $\$_{Dave}1$ to post and which has no child comments, has a total value of $1 and is thus ranked below Bob's comment. Esther, however, chose to pay Alice a premium of $\$_{Alice}3$, so her comment is displayed above both Bob's and Dave's.

In actual communities, individuals' currencies may be valued differently. If this is the case, the last direct currency exchange price between a central currency (typically the currency of the page's originator) and each of the other currencies is used to compute all currencies in terms of the central currency. Once this is done, they can be compared to each other.

For example, Alice may value Bob's currency at $\$_{Alice}1=\$_{Bob}0.5$, Carol's currency at $\$_{Alice}1=\$_{Carol}1$, and Dave's currency at $\$_{Alice}1=$Dave5.

The comments can be ranked by their total values given these exchange rates. Dave's comment is valued at $\$_{Alice}5$ and is thus ranked first. Esther's comment is valued at $\$_{Alice}3$, and is ranked second. Bob's comment is valued at $\$_{Alice}1.6$ ($\$_{Alice}0.5$ for Bob's comment plus $\$_{Alice}1.1$ for Carol's comment) and is therefore ranked last.

At times, there may be incomplete information for this type of exchange-based currency valuation. For example, Alice may have engaged in currency exchanges with Bob, Carol, and Dave, but not with Esther. In such a case, the community may simply choose to ignore the value of Esther's comment when ordering the page.

Alternatively, the community may opt for a different valuation model, such as setting all currencies to equal zero except for the currency of the page's originator. In this case, the comments are ranked according to which commenter paid the highest amount in the page originator's currency. In the present example, this would be Esther, since she is the only member to pay in Alice's currency. The order of Bob's and Dave's comments is arbitrary, and may be determined by some other factor such as which was posted first.

It is important to note that this ranking system functions within any contextual level. For example, the group homepage may consist of Alice's review ranked relative to other reviews based on the total amount of value associated with each review. As described above, this value is calculated by summing the prices paid by each member who has paid to post a comment in the context of Alice's review.

In such a context, without a page originator whose currency can serve as a yardstick, the different currencies will preferably be measured in terms of the viewer's exchange rates. This provides each viewer with an accurate portrayal of which reviews are likely to be of greatest value to him or her.

11. Exchange Of Music within a Community

Another potential use of the invention is to facilitate the exchange of music within a community. The exchange mechanisms described above allow for the fair and convenient distribution of value, incentivizing both the creation of new works by artists and the distribution of those works by other community members.

When an artist wishes to make a song available to the community, he or she registers the work by paying some amount of currency to the community registry. Once a work has been registered, it is posted on the artist's website for access by community members, with one price specified for modification rights and another price specified for distribution rights.

Anyone paying the distribution price is free to list the song subject to the rules of the exchange (for example, limiting access to only registered members) on his or her own website, potentially with added content such as a written review or a music video. Distributors can also group songs together in the form of an album and register the album as a new work unto itself. If another member wishes to buy the album outright, he or she may purchase it from the distributor who assembled it. In this case, some portion of the album's price is retained by the assembler and some portion is returned to the creators of the works on the album.

For example, suppose that a member, Alice, is the creator of a song (note that this "member" need not be an individual, but could also be a group such as a band that functions within the community as one member). Alice wishes to make a song available to the community, so she registers it by paying $\$_{Alice}100$ to the registry. Upon doing so, she uploads the song to her website and specifies a prices of $\$_{Alice}100$ to modify the song and $\$_{Anyone}1$ to distribute it.

Suppose also that Bob is a DJ. He listens to Alice's song and decides to make it the tenth and final song on his most recent mix. He registers the mix, specifying prices of $\$_{Bob}20$ for modification and $\$_{Anyone}10$ for distribution, and posts it on his website.

Carol decides to pay Bob $\$_{Carol}10$ to purchase distribution rights to his mix. This value is distributed to Bob and to each of the song's creators according to a pricing mechanism determined by the community. For example, the community may decide that for an album, Q, with songs 1 through N, where $P_i$ is the total amount paid by the DJ for the songs and $P_j$ is the price charged by the DJ for the album:

0.5$P_j$ goes to the DJ $P_{i/Pj}0.5P_j$ goes to each song's previous owner (that is, the sellers from whom the DJ acquired the songs)

In this example, Bob would keep $\$_{Carol}5$ and would disburse the remaining $\$_{Carol}5$ evenly among the ten previous song owners. Alice, assuming only one of her songs is on the mix, would receive $\$_{Someone}0.5$ every time Bob sells distribution rights to the mix.

Note that each of the ten songs on the mix is also available for distribution or modification on an individual basis from Bob's website. In this case, the price is set according to the terms determined by each song's previous owner, but the amount paid may be split between that previous owner and Bob. For Bob to sell modification rights, however, he must charge a sufficient amount that the work's creator receives payment in full for the outstanding price of modification rights. It should be noted, however, that this price may be less than originally stipulated by the work's owner; in the preferred embodiment, any time a community member pays the owner of a work in her own currency, the price of modification rights goes down by that same amount. In the current example, Alice started out by charging $\$_{Alice}100$ for modification rights. If, however, a community member had already purchased distribution rights for $\$_{Alice}1$, Bob would only be compelled to provide $\$_{Alice}99$ to Alice in order to sell modification rights. Presumably, Bob could keep a cut of any amount he charges above this.

For example, suppose Dave decides to download Alice's song from Bob's website. Dave pays $\$_{Dave}1$ to Bob, who keeps $\$_{Dave}0.5$ and disburses the remaining $\$_{Dave}0.5$ to Alice. Now suppose another community member, Esther, wishes to modify Alice's song (for example by producing a cover or a mash-up). Esther may purchase modification rights from Alice for $\$_{Alice}100$. Esther then registers the modified work as a new work by paying a certain amount to the registry and assigning modification and distribution prices in accordance with the group's pricing policies.

As with other uses of the invention, the value of a song may be used to rank it relative to other works within the community. Communities may opt to use different methods of calculating this value.

In an "initial-price model," a community is primarily concerned with the value placed on a work by its creator. In this case, only the price paid by the creator to register the work is used to compute its rank relative to other works.

In a "value-added model," a community is primarily concerned with the value placed on a work by the community at large. In this case, only the cumulative amount of the prices paid to modify or distribute the work is used to compute its rank.

In an "initial-price-plus-value-added model," a community is concerned with both the value placed on a work by its creator and the value placed on it by the community at large. In this case, both the initial registration price and all prices paid for modification or distribution of the work are used to compute its rank.

In any of these examples, the relative values of works may be used to order results returned by a search engine. For example, suppose that Alice's music exchange community ranks works according to a value-added model. Alice wants to search for songs in the community for which "love" is listed as a keyword. She submits "love" as a search term to a database containing keywords for all songs within the community. The search engine returns all matching songs, ordered by the accumulated values of each song's transactions within the community.

Note that in a community with multiple denominations of currency, this value calculation is subject to the community's system for currency exchange. Preferably, the results of the search are displayed according to the value of each item as expressed in the viewer's currency. The different denominations of currency comprising a work's value are converted into terms of the viewer's currency by using the most recent available exchange rate.

If a community wishes to use a different method of calculating exchange rates, or if there is not enough information to use the preferred method, rates may be calculated by an alternate method such as those laid out in the Book Club use case description.

A community may decide that its members should agree to some form of social contract regarding the distribution and use of digital works within the community. Specifically, such a social contract may include agreements on pricing standards and distribution and modification rights. Members guilty of breaking the social contract may be penalized or expelled from the community in accordance with agreed-upon rules.

To ensure that digital works are not misused by individuals outside of the community, limitations or notices may be placed on works when they are registered. For example, a community may decide to embed a copyright notice in every registered work before the work's hash is computed. If the work is distributed outside of the community, anyone can easily check its copyright and determine whether or not the work is being used in accordance with local governmental regulations.

It is also important to note that an individual guilty of violating a group's social contract for a specific work is guilty regardless of how he came to possess that work. For example, a work created and distributed within a community under the community's social contract may, lawfully or unlawfully, also be distributed outside of the community. Even if a community member obtains the work from sources outside of the community, he or she is still bound to deal with the work according to the terms of the community's social contract.

For example, suppose Frank purchases distribution rights to Alice's song and posts it to a website accessible to individuals outside of the community. Grace, who is not a member of the community, downloads the song from Frank's website and posts it to her own publicly accessible site. Later, Carol, who is a member of the community, obtains the work from Grace's site. However, if Carol wishes to distribute or modify Alice's work, she is still bound by the social contract to compensate Alice according to the community's agreed-upon rules.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX A

Log A

Log# 2005-3-11
    <begin date = 2005-3-11 Account = A123>S69754. . .</>
    <transaction id=596. .. .><work>G555. . . </>
        <credit_acct>A123. . . </>
        <debit_acct>B753. . . </>
        <Amount denomination=B753></>
        <previous transaction>T59476</>
    </transaction>
    . . . .
    <sig date= 2005-3-11    Account = A123
        Pubkey=A1249. . . . hash = H5684. . . .>
        S9765. . . .
    </sig>

Log B

<begin date = 2005-3-11
    Account = B753. . . .>
    S7869. . .    </begin>
<transaction id=596. . . .>
    <work>G555. . . </>
    <credit_acct>A123. . . </>
    <debit_acct>B753. . . </>
    . . . . .
    <previous transaction>T59476. . . </>
</transaction>
<transaction id=T647. . . . >
    <credit_acct> B753. . . </>
    <debit_acct>C864. . . </>
    <Amount denomination= B753. . . >2.0</>
    <date>2005-3-11    18:14:13</>
    <previous transaction>T59476. . . </>
</transaction>
<sig  date= 2005-3-11    Account = B753. . .
    Pubkey=B7569. . .    hash = H436. . .>
    S3692. . . .
</sig>

What is claimed is:

1. A system for an exchange of intangible goods, the system comprising:

a first system having an input and an output for storing at least one intangible good and for participating in at least one transaction, the first system having a first transaction log for storing information about transactions in which the first system participated, the first system publishing the first transaction log;

a second system having an input and an output for storing at least one intangible good and for participating in at least one transaction, the second system coupled to the first system for communication, the second system having a second transaction log for storing information about transactions in which the second system participated, the second system publishing the second transaction log, the second system sending an exchanged intangible good after a transaction corresponding to the exchanged intangible good is published in the first transaction log;

a hash module having an input and an output for generating a hash value to represent an intangible good to be exchanged, the hash module coupled to the first system and the second system;

a querying module having a user-interface for querying at least one of a cleared list transaction log, the first transaction log and the second transaction log using the generated hash value, the querying module coupled to the first system, and the second system; and a clearinghouse having an input and an output for reconciling transactions and allocating credits and debits by comparing information in the first transaction log and the second transaction log, the clearinghouse coupled to the first system and the second system to retrieve information about transactions from the first transaction log and the second transaction log, the clearinghouse coupled to the querying module to receive the generated hash value, the clearinghouse including the cleared list transaction log having at least one record including a hash value of an exchanged intangible good, an identifier of a seller and an identifier of a purchaser, the clearinghouse comparing the generated hash value to the cleared list transaction log thereby determining whether there exists a transaction record corresponding to the exchanged intangible good.

2. The system of claim 1 further comprising a registry having an input and an output for maintaining information about a plurality of users, and at least one intangible good, the registry coupled to the first system and the second system.

3. The system of claim 2 wherein the information maintained about the plurality of users includes at least one transaction.

4. The system of claim 1 wherein a buyer compares the generated hash value to the at least one of the cleared list transaction log, the first transaction log and the second transaction log thereby determining whether there exists a transaction record corresponding to the exchanged intangible good.

5. The system of claim 4 wherein the the exchanged intangible good is one from the group of an email address, a digital good, an identifier of a user and a transaction.

6. The system of claim 1 wherein the first system includes a content module having an input and an output, and being a repository for the intangible good, the content module capable of storing and making available the intangible good, the content module coupled to receive the intangible good from the user.

7. The system of claim 1 wherein the first system includes a transaction generator module having an input and an output for generating and sending a transaction representing an exchange of the intangible good or service, the transaction generator coupled to the clearinghouse.

8. The system of claim 1 wherein the first transaction log and the second transaction log are each a set of one or more web pages containing information about transactions.

9. The system of claim 2 wherein the registry includes a third transaction log module having an input and an output for storing, tracking and making available transactions, the third transaction log module coupled to the first system, the second system and the clearinghouse.

10. The system of claim 1 wherein the clearinghouse includes a fourth transaction log module having an input and an output for storing, tracking and making available transactions, the fourth transaction log module coupled to the first system, the second system.

11. The system of claim 2 wherein the clearinghouse communicates with the registry to confirm a registered location of a transaction log for at least one user in the registry.

12. The system of claim 7 wherein the first system includes a pricing module having an input and an output for determining a cost of a right related to an intangible good, the pricing module coupled to the transaction generator.

13. The system of claim 12 wherein the right is one from the group of a distribution right, a modification and distribution right and an exclusive distribution right.

14. The system of claim 9 wherein the registry further comprises an accounting module having an input and an output for settling accounts of parties affected by a transaction, the accounting module coupled to the transaction module.

15. The system of claim 10 wherein the clearinghouse further comprises an accounting module having an input and an output for settling accounts of parties affected by a transaction, the accounting module coupled to the transaction module.

16. The system of claim 14 wherein the clearinghouse further comprises an auditing module having an input and an output for validating a transaction by comparing parties logs of parties affected by the transaction, the auditing module coupled to the fourth transaction module and the accounting module.

17. The system of claim 1, wherein the second transaction log has an entry that includes information from the first system.

18. The system of claim 1, wherein the clearinghouse queries the first transaction log and the second transaction log, and reconciles a transaction by reconciling entries in the first transaction log and the second transaction log.

* * * * *